US012377372B2

(12) United States Patent
Dannemann

(10) Patent No.: US 12,377,372 B2
(45) Date of Patent: Aug. 5, 2025

(54) APPARATUS, SYSTEMS, AND PROCESSES EMPLOYING WET/DRY SUCTION FILTER WITH CHICANED SUCTION HEAD

(71) Applicant: GREATPYR RESOURCES LLC, Willis, TX (US)

(72) Inventor: Charles G. Dannemann, Willis, TX (US)

(73) Assignee: GreatPyr Resources LLC, Willis, TX (US)

( * ) Notice: Subject to any disclaimer, the term of this patent is extended or adjusted under 35 U.S.C. 154(b) by 108 days.

(21) Appl. No.: 17/826,360

(22) Filed: May 27, 2022

(65) Prior Publication Data

US 2022/0387912 A1  Dec. 8, 2022

Related U.S. Application Data

(60) Provisional application No. 63/208,325, filed on Jun. 8, 2021.

(51) Int. Cl.
*B01D 33/46* (2006.01)
*B01D 33/073* (2006.01)
(Continued)

(52) U.S. Cl.
CPC ......... *B01D 33/463* (2013.01); *B01D 33/073* (2013.01); *B01D 33/21* (2013.01); *C02F 1/004* (2013.01); *C02F 2303/16* (2013.01)

(58) Field of Classification Search
None
See application file for complete search history.

(56) References Cited

U.S. PATENT DOCUMENTS

| 690,030 | A | | 12/1901 | Parker |
| 963,049 | A | * | 7/1910 | Kenney ..................... A47L 9/02 |
| | | | | 15/325 |

(Continued)

FOREIGN PATENT DOCUMENTS

| CA | 2023302 A1 | 2/1991 |
| CN | 201085959 Y | 7/2008 |

(Continued)

OTHER PUBLICATIONS

UK Intellectual Property Office, Examination Report dated May 30, 2024 for application No. GB2208112.9.

(Continued)

*Primary Examiner* — Robert J Popovics
(74) *Attorney, Agent, or Firm* — Jeffrey L. Wendt; The Wendt Firm, P.C.

(57) ABSTRACT

Water or wastewater filtration systems and processes have a filter tank having a floor and sidewall defining a filtration zone, an influent conduit, and an effluent conduit. One or more filtration members in the tank having filter media, and one or more cleaning apparatus adjacent at least some portions of the filter media. Generating an effluent stream by generating a pressure differential across submerged portions of the filtration media, causing water in the influent to flow from outside to inside the submerged portions of the filter media. A prime mover rotates the filtration members. A blower and chamber for creating a reduced pressure condition in each cleaning apparatus when they are non-submerged, the chamber receiving wet solids removed from non-submerged, wet solids-laden portions of the filter media by the non-submerged cleaning apparatus subsequent to submerged, fouled portions of the filter media being rotated out of the filtration zone. The non-submerged filter media from which wet solids have been removed is further cleansed of collected solids and entrapped water employing (Continued)

air drawn from inside of the one or more drum filters by the blower.

11 Claims, 7 Drawing Sheets

(51) Int. Cl.
  *B01D 33/21* (2006.01)
  *C02F 1/00* (2023.01)

(56) References Cited

U.S. PATENT DOCUMENTS

| | | | | |
|---|---|---|---|---|
| 1,529,282 A * | 3/1925 | Warner | A47L 9/02 | 15/402 |
| 1,649,220 A | 11/1927 | Goodloe | | |
| 1,833,315 A | 11/1931 | Burhans | | |
| 1,859,132 A * | 5/1932 | Jorgen | A01K 13/002 | 132/219 |
| 1,894,905 A * | 1/1933 | Fechtenburg | A47L 9/0461 | 604/313 |
| 1,907,643 A * | 5/1933 | Demaree | A47L 9/02 | 15/325 |
| 1,908,069 A * | 5/1933 | Smellie | A47L 9/02 | 15/325 |
| 1,928,944 A * | 10/1933 | Mellen | A47L 9/02 | 15/402 |
| 1,936,369 A * | 11/1933 | Riebel, Jr. | A47L 9/02 | 15/374 |
| 1,959,167 A * | 5/1934 | Langille | A47L 9/02 | 15/325 |
| 1,980,438 A * | 11/1934 | Riebel | A47L 9/02 | 15/402 |
| 2,048,273 A * | 7/1936 | Ljungquist | A47L 9/02 | 15/420 |
| 2,210,030 A * | 8/1940 | Ellis | A47L 9/02 | 15/375 |
| 2,219,802 A * | 10/1940 | Gustaf | A47L 9/02 | 15/418 |
| 2,237,724 A * | 4/1941 | George | A47L 9/02 | 15/417 |
| 2,237,725 A * | 4/1941 | George | A47L 9/02 | 15/410 |
| 2,237,726 A * | 4/1941 | George | A47L 9/02 | 15/417 |
| 2,237,727 A * | 4/1941 | Ross | A47L 9/02 | 15/373 |
| 2,254,442 A * | 9/1941 | Norrick | A47L 9/02 | 15/373 |
| 2,275,357 A * | 3/1942 | Gaines | A47L 9/02 | 15/415.1 |
| 2,290,374 A * | 7/1942 | Gustaf | A47L 9/02 | 15/373 |
| 2,520,942 A * | 9/1950 | Leslie | A47L 9/02 | 15/325 |
| 2,528,278 A * | 10/1950 | Kendrick | A47L 9/02 | 15/373 |
| 2,603,354 A | 7/1952 | Way et al. | | |
| 2,621,798 A * | 12/1952 | Kracklauer | B01D 29/41 | 210/327 |
| 2,622,263 A * | 12/1952 | Allen | A47L 9/02 | 15/325 |
| 2,622,265 A * | 12/1952 | Allen | A47L 9/02 | 15/325 |
| 2,626,419 A * | 1/1953 | Anderson | A47L 9/02 | 15/402 |
| 2,629,126 A * | 2/1953 | Brown, Jr. | A47L 9/02 | 15/418 |
| 2,649,610 A * | 8/1953 | Segesman | A47L 9/06 | 15/420 |
| 2,650,810 A | 9/1953 | Nordell | | |
| 2,716,773 A * | 9/1955 | Meyerhoefer | A47L 9/0653 | 15/418 |
| 2,717,409 A * | 9/1955 | Draudt | A47L 9/06 | 15/375 |
| 2,789,308 A * | 4/1957 | Seck | A47L 9/06 | 15/420 |
| 2,997,284 A | 8/1961 | Nechine | | |
| 3,019,186 A * | 1/1962 | Powers | B01D 39/14 | 210/507 |
| 3,089,179 A * | 5/1963 | Taplin | A47L 9/02 | 15/371 |
| 3,116,021 A | 12/1963 | Born | | |
| 3,150,402 A * | 9/1964 | Alf | A47L 9/02 | 15/325 |
| 3,203,023 A * | 8/1965 | Jepson | A47L 9/0626 | 15/371 |
| 3,225,379 A * | 12/1965 | Cummins | A47L 9/02 | 15/375 |
| 3,268,942 A * | 8/1966 | Rossnan | A47L 9/08 | 15/346 |
| 3,339,901 A | 9/1967 | Walker | | |
| 3,357,566 A | 12/1967 | Schmid et al. | | |
| 3,520,012 A * | 7/1970 | Carabet | A47L 9/02 | 15/402 |
| 3,538,533 A * | 11/1970 | Woods | A47L 11/4036 | 15/236.09 |
| 3,611,473 A * | 10/1971 | Johnson | A47L 9/02 | 15/397 |
| 3,640,395 A | 2/1972 | Kinney | | |
| 3,668,734 A * | 6/1972 | Fairaizl | A47L 9/02 | 15/328 |
| 3,668,735 A * | 6/1972 | Dupea | A47L 9/02 | 15/397 |
| 3,673,048 A | 6/1972 | Gidge et al. | | |
| 3,685,089 A * | 8/1972 | Lagerstrom | A47L 9/02 | 15/365 |
| 3,708,824 A * | 1/1973 | Holubinka | A47L 9/02 | 15/397 |
| 3,733,646 A * | 5/1973 | Mein | A47L 9/04 | 15/388 |
| 3,739,422 A * | 6/1973 | Johnson | A47L 9/02 | 15/397 |
| 3,740,788 A * | 6/1973 | Kingston | A47L 11/4072 | 26/31 |
| 3,744,082 A * | 7/1973 | Marshall | A47L 9/02 | 15/246 |
| 3,745,603 A * | 7/1973 | Bayless | A47L 9/02 | 15/397 |
| 3,745,604 A * | 7/1973 | Fitzwater | A47L 9/02 | 15/397 |
| 3,755,055 A | 8/1973 | Lochner | | |
| 3,766,596 A * | 10/1973 | Clewett | A47L 9/02 | 15/397 |
| 3,771,193 A * | 11/1973 | Hageal | A47L 9/02 | 15/397 |
| 3,783,474 A * | 1/1974 | Fairaizl | A47L 9/02 | 15/422 |
| 3,787,920 A * | 1/1974 | Evans | A47L 9/02 | 15/397 |
| 3,795,938 A * | 3/1974 | Caporaso | A47L 9/02 | 15/369 |
| 3,797,066 A * | 3/1974 | Zaidan | A47L 9/02 | 15/369 |
| 3,800,359 A * | 4/1974 | Howard | A47L 9/02 | 15/37 |
| 3,815,171 A * | 6/1974 | Carr | A47L 9/02 | 15/397 |
| 3,816,872 A * | 6/1974 | Bayless | A47L 9/02 | 15/397 |
| 3,818,540 A * | 6/1974 | Martinec | A47L 9/02 | 15/368 |
| 3,825,972 A * | 7/1974 | MacFarland | A47L 9/02 | 15/373 |
| 3,857,786 A * | 12/1974 | Wolf, Jr. | B01D 29/70 | 210/334 |
| 3,894,308 A * | 7/1975 | Carr | A47L 9/02 | 15/397 |

(56) References Cited

U.S. PATENT DOCUMENTS

| | | | | |
|---|---|---|---|---|
| 3,895,407 A | * | 7/1975 | Parise | A47L 9/02 15/397 |
| 3,909,197 A | * | 9/1975 | Cremers | A47L 11/4016 8/158 |
| 3,913,169 A | * | 10/1975 | Seymour | A47L 9/02 15/388 |
| 3,919,729 A | * | 11/1975 | Cannan | A47L 11/4083 134/21 |
| 3,950,815 A | * | 4/1976 | Fukuchi | A47L 9/06 15/399 |
| 3,977,847 A | * | 8/1976 | Clark | B01D 46/28 428/95 |
| 3,992,748 A | * | 11/1976 | Howard | A47L 9/02 15/397 |
| 3,999,244 A | * | 12/1976 | Brickley | A47L 13/00 15/142 |
| 4,030,157 A | * | 6/1977 | Seymour | A47L 9/02 15/142 |
| 4,087,879 A | * | 5/1978 | Spence | B03C 1/30 15/142 |
| 4,090,965 A | | 5/1978 | Fuchs | |
| 4,095,309 A | * | 6/1978 | Sundheim | A47L 11/4094 15/322 |
| 4,143,441 A | * | 3/1979 | Brooks | A47L 9/02 15/373 |
| 4,152,265 A | | 5/1979 | Meyers | |
| 4,156,298 A | * | 5/1979 | Spence | A47L 13/40 15/388 |
| 4,167,482 A | | 9/1979 | Mueller | |
| 4,273,732 A | | 6/1981 | Roediger | |
| 4,291,430 A | * | 9/1981 | Hightower | B03C 1/28 15/142 |
| 4,300,261 A | * | 11/1981 | Woodward | A47L 9/08 15/345 |
| D262,671 S | * | 1/1982 | Erickson | D4/136 |
| 4,333,205 A | * | 6/1982 | Woodward | A47L 5/14 15/345 |
| 4,563,277 A | | 1/1986 | Tharp | |
| 4,639,315 A | | 1/1987 | Fuch et al. | |
| 4,643,828 A | | 2/1987 | Barzuza | |
| 4,646,769 A | | 3/1987 | O'Brien et al. | |
| 4,702,845 A | | 10/1987 | Wykoff | |
| 4,702,847 A | | 10/1987 | Fux et al. | |
| 4,725,292 A | | 2/1988 | Williams | |
| 4,759,846 A | | 7/1988 | MacFarlane | |
| 4,818,402 A | | 4/1989 | Steiner et al. | |
| 4,869,823 A | | 9/1989 | Otani et al. | |
| 4,898,671 A | | 2/1990 | Fux et al. | |
| 5,152,891 A | | 10/1992 | Netkowicz et al. | |
| 5,268,095 A | | 12/1993 | Barzuza | |
| 5,290,487 A | | 3/1994 | Ludwig | |
| 5,346,519 A | | 9/1994 | Williams | |
| 5,356,532 A | | 10/1994 | Wilkins et al. | |
| 5,362,401 A | * | 11/1994 | Whetsel | B01D 33/804 210/791 |
| 5,374,360 A | | 12/1994 | Weis | |
| 5,401,405 A | | 3/1995 | McDougal | |
| 5,409,618 A | | 4/1995 | Price | |
| 5,464,542 A | | 11/1995 | Grienberger et al. | |
| 5,514,270 A | | 5/1996 | Barzuza | |
| 5,560,835 A | | 10/1996 | Williams | |
| 5,587,114 A | | 12/1996 | Tharp | |
| 5,615,494 A | * | 4/1997 | Ekberg | B01D 33/466 34/585 |
| 5,635,066 A | | 6/1997 | Maurer | |
| 5,647,092 A | * | 7/1997 | Miwa | A47L 5/14 15/397 |
| 5,653,874 A | | 8/1997 | Berry, III | |
| 5,690,864 A | | 11/1997 | Tyer | |
| 5,876,612 A | | 3/1999 | Astrom | |
| 5,925,155 A | | 7/1999 | Rodgers | |
| 5,951,878 A | | 9/1999 | Astrom | |
| 6,090,298 A | | 7/2000 | Weis | |
| 6,103,132 A | | 8/2000 | Seyfried et al. | |
| 6,110,374 A | * | 8/2000 | Hughes | C02F 1/5236 210/702 |
| 6,173,473 B1 | * | 1/2001 | Miwa | A47L 9/02 15/422.2 |
| 6,267,879 B1 | | 7/2001 | Gil | |
| 6,294,098 B1 | | 9/2001 | Bergmann | |
| 6,421,875 B1 | * | 7/2002 | Coombs | A47L 9/02 15/420 |
| 6,568,024 B2 | * | 5/2003 | Kent | A47L 9/06 15/322 |
| 6,793,823 B2 | | 9/2004 | Hubenthal et al. | |
| 6,858,140 B2 | | 2/2005 | Smith et al. | |
| 6,981,338 B2 | * | 1/2006 | Jensen | A47L 7/0042 34/92 |
| 7,097,046 B2 | | 8/2006 | Calabrese | |
| 7,270,750 B2 | | 9/2007 | Galland et al. | |
| 7,300,585 B1 | | 11/2007 | Holzworth et al. | |
| 7,485,231 B2 | | 2/2009 | Yeom et al. | |
| 7,526,848 B2 | | 5/2009 | Lindbo | |
| 7,537,689 B2 | | 5/2009 | Ricketts | |
| 7,661,173 B2 | * | 2/2010 | Amos | B08B 1/00 134/6 |
| 7,678,284 B2 | | 3/2010 | Ricketts | |
| 7,694,382 B2 | * | 4/2010 | Williams | A47L 11/30 15/322 |
| 7,736,526 B2 | | 6/2010 | Smith et al. | |
| 7,807,050 B2 | | 10/2010 | Baumann et al. | |
| 7,820,062 B2 | | 10/2010 | Ricketts | |
| 7,833,424 B1 | | 11/2010 | Baumann et al. | |
| 7,871,527 B2 | | 1/2011 | Smith et al. | |
| 7,981,290 B2 | | 7/2011 | Baumann | |
| 8,048,296 B2 | | 11/2011 | Stevens | |
| 8,101,090 B2 | | 1/2012 | Ralvert | |
| 8,329,045 B2 | | 12/2012 | Baumann et al. | |
| 8,444,862 B2 | | 5/2013 | Ralvert | |
| 8,518,273 B2 | | 8/2013 | Lownertz et al. | |
| 8,640,883 B2 | * | 2/2014 | Doig | B01D 29/682 210/791 |
| 8,641,309 B2 | * | 2/2014 | Perry | A47L 13/26 401/268 |
| 8,647,516 B2 | | 2/2014 | Love | |
| 8,778,174 B2 | | 7/2014 | Xia et al. | |
| 8,852,445 B2 | | 10/2014 | Xia et al. | |
| 9,221,000 B2 | * | 12/2015 | Doig | B01D 29/66 |
| 9,352,255 B2 | | 5/2016 | Kuk et al. | |
| 9,561,454 B2 | * | 2/2017 | Browning | B01D 29/035 |
| 9,713,408 B2 | * | 7/2017 | Moyher, Jr. | A47L 9/0666 |
| 10,195,549 B1 | * | 2/2019 | Grabbe | B01D 29/68 |
| 10,688,419 B2 | * | 6/2020 | Browning | B01D 29/688 |
| 10,751,764 B2 | * | 8/2020 | Dagan | B08B 5/04 |
| 10,905,981 B2 | * | 2/2021 | Dannemann | B01D 35/10 |
| 10,905,984 B2 | * | 2/2021 | Landwehr | B01D 33/62 |
| 11,504,655 B2 | * | 11/2022 | Kuk | B01D 33/461 |
| 11,529,573 B2 | * | 12/2022 | Sergerie | C02F 1/004 |
| 11,724,218 B2 | * | 8/2023 | Kuk | B01D 33/503 210/391 |
| 12,090,428 B2 | * | 9/2024 | Sergerie | B01D 33/073 |
| D1,055,441 S | * | 12/2024 | Liu | D32/46 |
| 2002/0050283 A1 | | 5/2002 | Bergmann | |
| 2002/0166512 A1 | * | 11/2002 | Corbett | A01K 13/002 119/611 |
| 2003/0146171 A1 | * | 8/2003 | Herrmann | B01D 29/055 210/411 |
| 2004/0112825 A1 | * | 6/2004 | Villares Lenz Cesar | B01D 33/067 210/391 |
| 2004/0124158 A1 | | 7/2004 | Smith et al. | |
| 2004/0132373 A1 | | 7/2004 | Muller | |
| 2004/0245190 A1 | | 12/2004 | Baumann et al. | |
| 2005/0000870 A1 | | 1/2005 | Ricketts | |
| 2005/0115911 A1 | | 6/2005 | Smith et al. | |
| 2005/0139557 A1 | * | 6/2005 | Ricketts | B01D 29/54 210/791 |
| 2005/0161393 A1 | | 7/2005 | Baumann et al. | |
| 2005/0178403 A1 | * | 8/2005 | Amos | B08B 1/165 15/236.08 |
| 2008/0011666 A1 | | 1/2008 | Baumann et al. | |

(56) References Cited

U.S. PATENT DOCUMENTS

| | | | |
|---|---|---|---|
| 2009/0026152 A1* | 1/2009 | Collins | B01D 39/02 |
| | | | 210/791 |
| 2009/0178976 A1 | 7/2009 | Stevens | |
| 2010/0206823 A1* | 8/2010 | Ricketts | B01D 29/54 |
| | | | 210/791 |
| 2010/0300957 A1 | 12/2010 | Baumann et al. | |
| 2010/0300989 A1 | 12/2010 | Baumann et al. | |
| 2011/0031177 A1* | 2/2011 | Ricketts | B01D 29/05 |
| | | | 210/236 |
| 2011/0108496 A1 | 5/2011 | Baumann et al. | |
| 2011/0120960 A1 | 5/2011 | Smith et al. | |
| 2012/0091065 A1 | 4/2012 | Xia et al. | |
| 2013/0048553 A1* | 2/2013 | Kuk | B01D 29/68 |
| | | | 210/411 |
| 2013/0068685 A1 | 3/2013 | Baumann et al. | |
| 2013/0105415 A1 | 5/2013 | Xia et al. | |
| 2014/0048474 A1* | 2/2014 | Kuk | B01D 33/50 |
| | | | 210/393 |
| 2016/0059156 A1* | 3/2016 | Dannemann | B01D 29/688 |
| | | | 210/791 |
| 2016/0114265 A1 | 4/2016 | Liberman | |
| 2017/0088435 A1 | 5/2017 | Schuiten | |
| 2017/0157541 A1* | 6/2017 | Landwehr | B01D 29/80 |
| 2017/0165597 A1 | 6/2017 | Kotler | |
| 2017/0361358 A1* | 12/2017 | Huettinger | B08B 5/023 |
| 2018/0078883 A9* | 3/2018 | Dannemann | B01D 29/684 |
| 2018/0099237 A1 | 4/2018 | Silverwood et al. | |
| 2021/0187420 A1* | 6/2021 | Sergerie | B01D 33/807 |
| 2021/0283537 A1* | 9/2021 | Kuk | B01D 33/21 |
| 2022/0304541 A1* | 9/2022 | Bian | A47L 13/42 |
| 2022/0304542 A1* | 9/2022 | Bian | A47L 11/201 |
| 2022/0387912 A1* | 12/2022 | Dannemann | B01D 33/21 |
| 2023/0032256 A1* | 2/2023 | Kuk | B01D 33/21 |
| 2023/0173417 A1* | 6/2023 | Sergerie | B01D 33/82 |
| | | | 210/324 |
| 2023/0277962 A1* | 9/2023 | Moon | B01D 33/801 |
| | | | 210/409 |

FOREIGN PATENT DOCUMENTS

| | | |
|---|---|---|
| CN | 106731152 A | 5/2017 |
| CN | 108654182 A | 10/2018 |
| GB | 473232 A | 10/1937 |
| GB | 2162080 A | 1/1986 |
| JP | 2005270808 A | 10/2005 |
| NL | 8103750 A | 3/1983 |
| WO | WO2009/128763 A1 | 10/2009 |

OTHER PUBLICATIONS

Nexom website pages for "INFINI-D"(TM) cloth disk filter, downloaded from the Internet Mar. 18, 2020, at URL: https://nexom.com/infini-d.

Ashbrook Simon-Hartley, ISO-DISC(TM) booklet, 47 pages, Ashbrook Simon-Hartley Operations, LP, 2009.

California Water Boards, "Alternative Treatment Technology Report for Recycled Water", p. 1-67, State of California, 2014.

Aqua-Aerobic Systems, Inc. brochure, "Cloth Media Filtration", pp. 1-12, Aqua-Aerobics Systems, Inc., 2019.

Aqua-Aerobic Systems, Inc. brochure, "AquaDrum(R) Cloth Media Filter", pp. 1-2, Aqua-Aerobics Systems, Inc., 2013.

Ashbrook Simon-Hartley Operations LP brochure, "ISO-DISC(R) Disk Filter", pp. 1-2, Ashbrook Simon-Hartley Operations LP, 2010.

Ashbrook Simon-Hartley Operations LP brochure, "ENVIRO-DISC(TM) Disk Filter", pp. 1-2, Ashbrook Simon-Hartley Operations LP, 2008.

Aqua-Aerobic Systems, Inc. brochure, "Aqua Cloth Media Filtration", pp. 1-8, Aqua-Aerobics Systems, Inc., 2006.

Mansell, et al., "Pilot Scale Evaluation of Cloth Media Filter Technology", pp. 1-8, published by Sanitation Districts of Los Angeles County, 2008.

Furuya, A., "Evaluation and Design of a Cloth Disk Filter to Meet Title 22 Reuse Criteria", pp. 1-11, Jan. 1, 2005.

Five Star Filtration LLC brochure, "Five Star Disk Filter", pp. 1-4, Five Star Filtration LLC, 2018.

\* cited by examiner

APPARATUS, SYSTEMS, AND PROCESSES EMPLOYING WET/DRY SUCTION FILTER WITH CHICANED SUCTION HEAD

CROSS-REFERENCE TO RELATED APPLICATIONS

This application is entitled to and claims the benefit of earlier filed provisional application Ser. No. 63/208,325, filed Jun. 8, 2021, under 35 U.S.C. § 119(e), which earlier filed provisional application is incorporated by reference herein in its entirety.

BACKGROUND INFORMATION

Technical Field

The present disclosure relates to systems and processes for water and wastewater filtration. In particular, the present disclosure relates to systems and processes featuring one or more filtration members that may be operated partially or fully submerged, and subsequently cleaned when partially or fully submerged.

Background Art

Disk filters typically applied to water treatment/purification typically are available in one of two forms as described below. The majority of the existing innovation relates to the design of backwash shoes or sprayers that are used to clean the filter media either by backwashing under suction with filtrate or pressure washing with filtrate.

In our co-pending U.S. patent application Ser. No. 16/708,645, filed Dec. 10, 2019, which is incorporated herein by reference, we summarized the two predominant water treatment/purification systems. One system may be described as a partially submerged, pressure wash, "mesh" screen (flat, woven, media), disk filter. In these systems the filter media is partially submerged, and the portion that is not submerged is subjected to pressure washing to clean the mesh or wire fabric (cloth) filters. These filters operate with the active filter media partially submerged and filter "inside to outside" with contaminants collecting on the inside of the filter disks. When backwashed or regenerated, the disks are rotated, and the exposed (non-submerged) portion of the disks are pressure washed from the exterior to dislodge the solids which are collected in an interior trough for removal from the system. These filters must backwash "through" the media from clean side to dirty side to regenerate.

Other available and known systems may be described as fully submerged, flooded suction, cloth/pile media, disk (or drum type) filters. These filters operate with the active filter media fully submerged and filter "outside to inside" with contaminants collecting on the outside of the filter disk or drum cloth media coated surfaces. When backwashed or regenerated, the disks are rotated (such as employed in commercial systems known under the trade designations AQUADISK and AQUADRUM) or backwash heads are actuated (such as employed in commercial systems known under the trade designations ISO-DISC, FIVE STAR, NEXOM INFINI-D) and the fully submerged disks are vacuumed with reverse water flow of filtered water from the interior of the disk by a solids handling water pump with the collected solids being pumped from the system.

The role of cleaning heads in cloth media filtration are paramount for successful and sustainable process operation. The importance and novelty of cleaning head design as related to cloth media filtration is noted within U.S. Pat. Nos. 8,048,296; 8,852,445, and 6,103,132 as examples.

Cleaning heads are primarily designed to clean the cloth filter media effectively utilizing the properties of mass transfer to fluidize and remove foulants from the cloth media. A good cleaning head design will also significantly reduce or minimize the amount of wastewater generated during the rejuvenation/cleaning of the cloth media. The secondary requirements of a cleaning head are that they are designed mechanically to hold the cloth media in place whilst cleaning in order to prevent the media from moving, stretching and/or deforming in a plastic manner and be designed to distribute or minimize friction on the cloth media to prevent compaction, matting or accelerated wearing of the cloth media fibers. Failure of a cleaning head design to meet the above objectives leads to uncleaned cloth which can no longer filter water or damaged cloth media which will have a shortened life or potentially fail catastrophically.

In summary, a cleaning head must effectively clean the cloth without interfacing with the cloth media in a manner that is mechanically detrimental for the cloth.

Current cleaning head designs operate in manner which are based on the perpendicular reversal of flow of filtered water through cloth media. This is commonly referred to as "backwash." This design approach utilizes a flow of filtrate in a singular direction which is counterflow to the complied foulants on the cloth media (meaning the cleanest backwash water approaches the cloth media from the cleanest side and passes through the cloth to exit via the dirties side). This core definition of purpose exists in numerous patents relevant to the field of cloth media filtration. U.S. Pat. No. 8,852,445 discloses a backwash shoe having hood and slot structure, wherein the hood structure allows relatively clean fluid to pass through the filter material in a reverse direction upon application of a suction pressure in the internal cavity by a backwash pump, and allow the relatively clean fluid and solids previously adhered to the fibers to the enter a chamber, then the slot and an internal cavity while substantially preventing other relatively less clean fluids. U.S. Pat. No. 8,048,296 discloses means for backwashing filters in response to a predetermined pressure differential being detected by a sensor. U.S. Pat. No. 6,103,132 discloses blocking the pile threads of the filter cloth by mechanical action of a suction bar from straightening up until they have reached the area of a suction slit and can be straightened up abruptly in that area. U.S. Pat. No. 10,195,549 describes a similar backwash shoe.

While effective, counter-current backwashing designs have some disadvantages which include:
- The cleaning heads/suction bars described in the above-referenced patents are designed to be used exclusively in a fully submersed state with a singular fluid material, typically water, for cleaning.
- The use of a singular mass transfer direction for cleaning and/or a singular, focused cleaning zone within the cleaning head intended to function with only "filtrate" backwash influences negatively the rate at which cleaning may be conducted and increases the volume of waste as the fouled media must be "washed" for a longer period of time using larger volumes to water to effectively remove a soils within the cloth.
- The use of 100% filtered water for cloth cleaning, which increases waste volumes.

Some current cleaning heads use flat skid plates or hood structures to interface with cloth media and which come in continuous firm contact with the fouled surface of the filter media. This, combined with the suction of the cleaning head, typically causes the cleaning head to press (embed) into the cloth as it travels leading to a squeegee effect at the leading edge of the cleaning head which expels foulants from the cloth back into the filtration chamber, leading to more frequent cleaning and associated backwash volumes, or pushes foulants through the filter cloth and into the filtrate, decreasing filtrate quality.

Ideally, cleaning heads come in contact with the filter media on both forward side and afterward side of the cleaning slot in order to hold the cloth in place relative to the cleaning slot to reduce filter media stretching—such as the designs disclosed in U.S. Pat. Nos. 8,852,445 and 6,103,132. Alternative designs, such as disclosed in U.S. Pat. No. 8,048,296, for example, utilize a unidirectional design which have an offset level designed into the cleaning head. The detailed description of the '296 patent discloses that the intent of the design is to have the cleaning head (suction bar) have minimal actual contact of the two surfaces, thereby reducing wear of the filter media. The '296 patent under claim 15 recites: "wherein each of first and second members has a leading portion and a trailing portion relative to a direction of movement of the member across the corresponding external surface of each filter, wherein the trailing portion of each member contacts the pile threads of each filter while the leading portion does not contact the pile threads."

Current designs are also of static fixed design which offer no adjustability to modify the velocities or volumes of the cleaning fluids preventing optimization of cleaning efficacy from application to application.

As may be seen, current backwash/cleaning heads may not be adequate for all circumstances, and may result in one or more deficiencies as noted above. There remains a need for more robust cleaning heads, and filtration systems and processes emplying same. The cleaning heads, systems and processes of the present disclosure are directed to these needs.

SUMMARY

In accordance with the present disclosure, apparatus (sometimes referred to herein as "cleaning heads", or "cleaning head apparatus", or "cleaning apparatus"), systems and processes are described which reduce or overcome many of the faults of previously known apparatus, systems and processes.

A first aspect of the disclosure are apparatus, one embodiment comprising (or consisting essentially of, or consisting of):
 a) a substantially hollow conduit (for example cylindrical or rectangular in cross-section, but not limited thereto) having a length L and a width W, the conduit defining an interior space, the conduit having a suction source opening and at least one suction opening, the suction opening (or openings) having a length Ls, where $0 < Ls < L$ (or $0.5L < Ls < L$); and b) at least one obstacle (for example, chicanes, baffles, or nubbins, or combinations thereof) removably attached to the conduit and positioned at least on a first side of the at least one suction opening(s).

In certain embodiments the substantially hollow conduit may comprise a hollow rectangular box having a bottom face in which the at least one suction opening is a slot positioned and dividing the bottom face into a leading surface and a trailing surface, and the at least one obstacle(s) are removably attached to the leading surface. For ease of refence, a single slot opening will be referred to herein, it being understood that more than one suction opening may be present, and they may have shape different than "slot." In certain embodiments the at least one obstacle may comprise at least one chicane. The obstacle(s) function to force some pile fibers to traverse around the periphery of the obstacle(s) and to increase velocity and turbulence of cleaning fluid, where the cleaning fluid may be feed water, filtrate or air depending on if the cleaning head is positioned above or below the water line in a partially or fully emerged state, being suctioned into the apparatus through the suction slot opening. In certain embodiments the at least one obstacle may comprise a first row of obstacles positioned on the first side of the suction slot opening and a second row of obstacles positioned on a second side of the suction slot opening. In certain embodiments the at least one obstacle may comprise a first row of two or more obstacles positioned on the first side of the suction slot opening and a second row of two or more obstacles positioned on a second side of the suction slot opening. In certain embodiments each of the obstacles are chicanes having a round, substantially flat disc shape with radiused edges. In certain embodiments all chicanes have same dimensions in terms of shape, width, height, and degree of radiusing of edge(s). In certain embodiments, the first row and the second row each have the chicanes evenly spaced, and the chicanes in the first row are offset from the chicanes in the second row. The use of the term 'cleaning fluid' shall mean any fluid, liquid or gas, which is used to transport pollutants from filtration media and would include the use of air as a cleaning fluid in systems which are cleaned above the water line and the use of both feed water and/or filtered water in systems which are cleaned below the water line.

Certain embodiments may further comprise an adjustable blade or gate attached to the conduit that maybe heightened or shortened against a profile of the at least one obstacle to modify open clearance available for tangential cleaning fluid flow, the gate or blade having an edge shape selected from flat (straight-edged), toothed, and arcuate (for example, undulating wave), the gate or blade comprising ridged or flexible material.

Certain embodiments may further comprise, in combination, a spray bar and pump to continuously apply an incompressible fluid, typically a liquid, to block or partially block void spaces between the at least one obstacle(s) to influence velocities of the cleaning fluid(s).

In certain apparatus embodiments, rather than the at least one obstacle being removably attached to the conduit, the at least one obstacle(s) is/are machined into the substantially hollow conduit.

A second aspect of the disclosure are water or wastewater filtration systems including one or more apparatus of the first aspect of this disclosure. In certain embodiments the filtration members may comprise a single filter drum, while in certain other embodiments the filtration members may comprise one or more filter disks. In certain embodiments the systems may comprise two or more filters, for example, two or more filters having substantially the same filter media arranged in parallel flow relationship, or two or more filters having the same or different filter media arranged in series flow relationship, or combinations of parallel and series arrangements. In certain filter drum embodiments, a single cleaning member may be employed. In certain disk filter embodiments there may be a single cleaning member on each side of each filter disk, whereas in other embodiments one or more filter disks may have two or more cleaning members on a first side of the filter disks, and one or more cleaning members on a second side of the filter disks. Embodiments are also contemplated where the filter disks are all substantially the same size in width and radius.

A third aspect of the disclosure are processes for treating water or wastewater employing a system of the second aspect. A key aspect of systems and processes of the present disclosure is that the non-submerged filter media (especially pile cloth and knitted filter media) from which wet solids have been removed is further cleansed of collected solids and entrapped water employing air drawn from inside of the one or more drum or disk filters by a blower.

Certain process and system embodiments of this disclosure may operate in modes selected from the group consisting of automatic continuous mode, automatic periodic mode, and manual mode. In certain embodiments the one or more operational equipment may include prime movers selected from the group consisting of pneumatic, electric, fuel, hydraulic, and combinations thereof. It will also be appreciated that in certain embodiments, one or more of the one or more apparatus of the first aspect may also move, and this movement may be before, during, or after the rotation of the filter media, and may be continuous, periodic, or oscillatory. The direction of movement of the apparatus in drum filter embodiments is not limited, and, for example may be, but is not limited to transverse, longitudinal, or other orientation to the drum longitudinal axis. Direction of movement of the apparatus in disk filter embodiments may be radial, either away from or toward the disk center (or both), or translational across the disk surface in any number of directions or patterns (random or non-random).

These and other features of the apparatus, systems and processes of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein, and vice versa. It should be further understood that wherever the term "comprising" is used herein, other embodiments where the term "comprising" is substituted with "consisting of" are explicitly disclosed herein, and vice versa. Moreover, the use of negative limitations is specifically contemplated; for example, certain systems may include a cleaning composition supply vessel, supply conduit, and one or more spray nozzles, while other systems may be devoid of these features. In certain embodiments the filter media may be devoid of filter cloth. As another example, a system may be devoid of a pump, an influent weir, or sludge handling features for removal of sludge that may build up in the bottom of the filter tank.

BRIEF DESCRIPTION OF THE DRAWINGS

The manner in which the objectives of this disclosure and other desirable characteristics can be obtained is explained in the following description and attached drawings in which.

Figure 1:
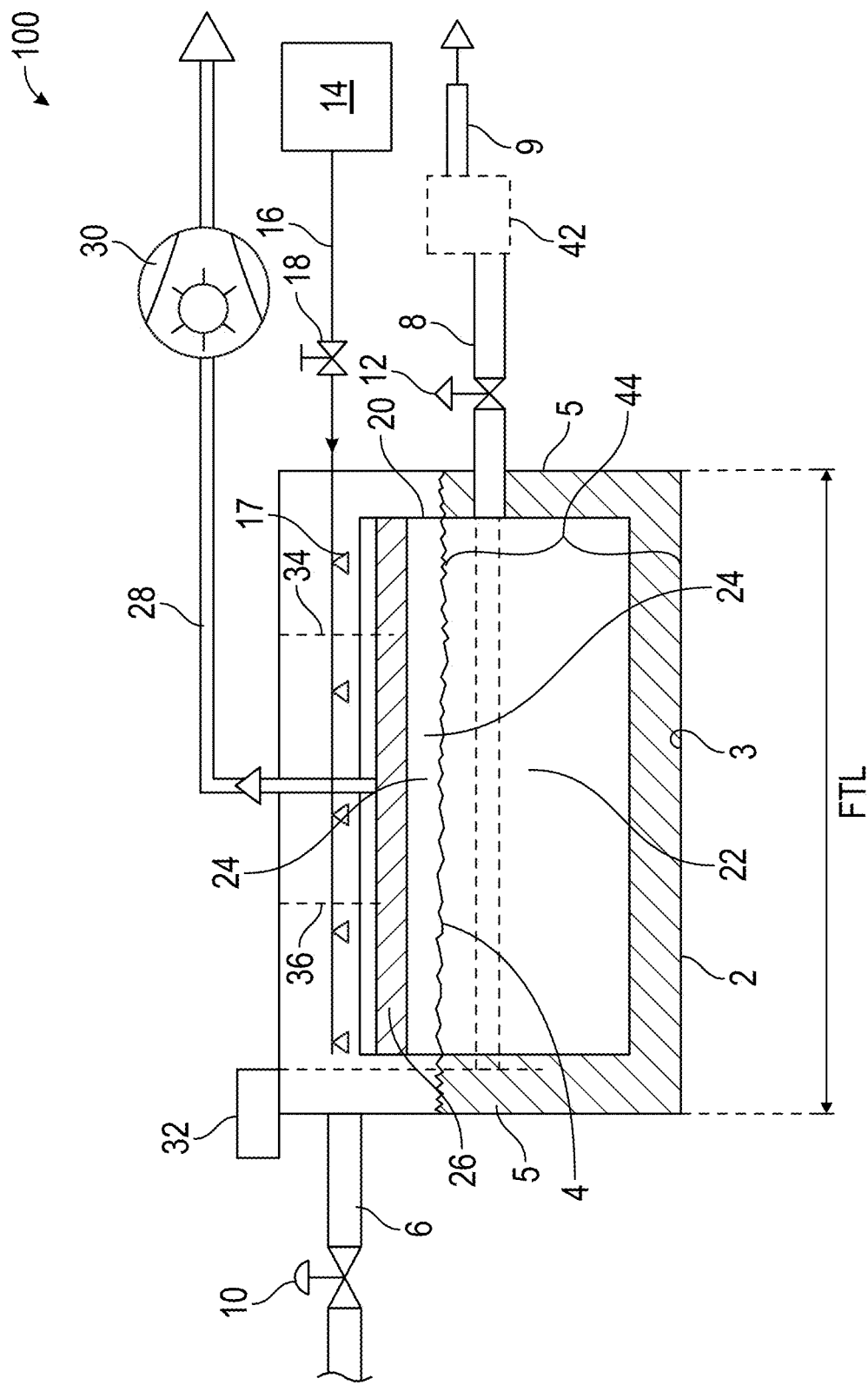
FIG. 1 is a high-level schematic diagrammatical representation of one system and process in accordance with the present disclosure.
Figure 2:
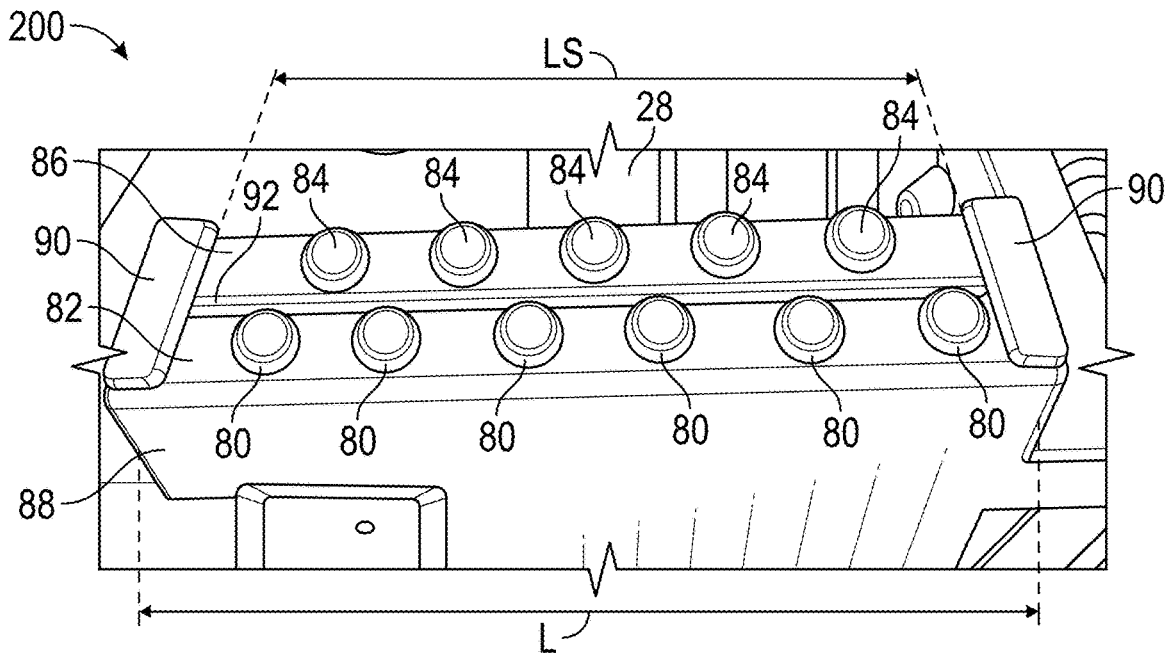
FIGS. 2-6 and 14-17 are schematic illustrations of various views of several apparatus embodiments in accordance with the present disclosure.

It is to be noted, however, that the appended drawings are not to scale, and illustrate only some apparatus, system and process embodiments contemplated by this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the systems and processes of the present disclosure. However, it will be understood by those skilled in the art that the apparatus, systems and processes disclosed herein may be practiced without these details and that numerous variations or modifications from the described embodiments may be possible. All technical articles, U.S. published and non-published patent applications, standards, U.S. patents, U.S. statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=RL+k*(RU-RL)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

The term "comprising" and derivatives thereof is not intended to exclude the presence of any additional component, step or procedure, whether or not the same is disclosed herein. In order to avoid any doubt, all systems, processes, and compositions claimed herein through use of the term "comprising" may include any additional component, step, additive, adjuvant, or compound whether monomeric, oligomeric, polymeric or otherwise, unless stated to the contrary. In contrast, the term, "consisting essentially of" excludes from the scope of any succeeding recitation any other component, step or procedure, excepting those that are not essential to operability. The term "consisting of"

excludes any component, step or procedure not specifically delineated or listed. The term "or", unless stated otherwise, refers to the listed members individually as well as in any combination.

As noted in the Background, current cleaning heads in suction cleaned cloth media filters are primarily designed to function with a singular cleaning path which is a counter flow, perpendicular flow pattern which reverses, or backwashes, the flow of filtered water thru the cloth media from the cleanest side to the dirtiest side where suction is applied. The efficacy of this process is dependent on the rate at which the cleaning head moves across the cloth combined with the volume and the reverse velocity of the filtered liquid used for cleaning.

In contrast, the novel cleaning head apparatus of the present disclosure improve on current cleaning head/shoe cleaning efficacy by introducing additional paths of mass transfer. The cleaning heads of the present disclosure permit two or more of the following mechanisms (as explained further in reference to FIG. 11):

- A primary, Tangential Parallel Flow Mass Transfer which consists of Non-filtrate cleaning fluid, which maybe air when the cleaning head resides above the water line or unfiltered feed water in systems where the cleaning head resides below the water line, may enter the leading face of the cleaning head at sufficient velocity to scour the soiled side of the fouled cloth media, fluidize and mechanically stimulate the fibers of the cloth media in a parallel path with the foulants.
- A secondary, Perpendicular Counter Flow Mass Transfer (aka Conventional Cleaning) which consists of a perpendicular, counter flow of cleaning fluids, which maybe air when the cleaning head resides above the water line or filtered water/filtrate in systems where the cleaning head resides below the water line, which flow from the clean side of the filter media, thru the media, exiting the fouled side of the media.
- A tertiary, Tangential Counter Flow Mass Transfer which consists of Non-filtrate cleaning fluid, which maybe air when the cleaning head resides above the water line or unfiltered feed water in systems where the cleaning head resides below the water line, may enter the trailing face of the cleaning head at sufficient velocity to scour the soiled side of the cloth media, fluidize and mechanically stimulate the fibers of the cloth media in a counter-flow path with the foulants.

Reduction of Cleaning Head Squeegee/Solids Push Thru/Solids Push Off:

Current designs of cleaning heads or shoes, with a forward leading surface which is in contact with the cloth filter media, when combined with a source of suction of cleaning creates an adherence or embedment of the cleaning head to the cloth media which compresses the cloth media to an additional extent when compared to the cloth filter media not in contact with the cleaning head. As the cleaning head moves relative to the cloth (via movement of the head on a static cloth or movement of the cloth on a static head, or movement of both the head and the cloth simultaneously) the leading edge of current cleaning shoes act to compress and expel some of the contaminants entrapped in the filter media. The expelled contaminants may be fluidized back into the surrounding liquid to be re-filtered which increases filter cleaning frequency and waste volumes.

A second effect of the cleaning head embedment are contaminants being driven through the filter media by application of force additional to the static liquid head in the filter where the contaminants mix with the filtrate and degrade the average filtrate quality.

Other cleaning head designs, such as those in U.S. Pat. No. 8,048,296 utilize an offset but continuous leading (forward) edge. The cleaning head or suction bars described in this patent are unidirectional, meaning they are intended to have a non-reversible forward and aft face. The cleaning heads in this patent rely on the forward hydraulic flow of water being filtered to maintain a compressed filter media: "Before the pile threads 311 of the filter media 310 reach the suction slit 305, the pile threads are forced into the flattened position and prevented from straightening up by the flow of water." The "flow of water" is illustrated schematically in FIGS. 3 and 5 of the '296 patent and notedly depicted to be perpendicular to the feed side of the filter media without tangential influence from the feed side of the filter media.

Referring now to the drawing figures, FIG. 1 is a high-level schematic diagrammatical representation of one system and process embodiment 100 in accordance with the present disclosure. Embodiment 100 includes a filter tank 2 having a floor 3, a sidewall structure 5, and a maximum water level 4, an influent conduit 6 including an optional influent flow control valve and/or tank level control valve 10 (depending on the process control scheme used), a low-pressure effluent conduit 8 having an optional effluent flow control valve 12, and a drum filter (sometimes referred to as a filter drum) 20 having a submerged filter media portion 22 and a non-submerged filter media portion 24. Embodiment 100 may further include an optional pump 42 fluidly connected to the low pressure effluent conduit 8 and to a high-pressure conduit 9, which directs effluent to another unit operation, or another filter, or storage facility (not illustrated). Low-pressure effluent conduit 8 extends through drum filter 20 and mechanically connects on a distal end with a motor/chain/sprocket assembly 32, which rotates drum filter 20. Low-pressure effluent conduit 8 includes a plurality of slots, holes, or other through-holes extending from its external surface to its internal surface in known fashion, creating the differential pressure on the filter media covering the filter drum. As this is well-known and not part of the present disclosure, it is not discussed further herein.

Still referring to FIG. 1 and the high-level schematic diagrammatical representation embodiment 100, filter tank floor 3 and sidewall structure 5, along with maximum water level 4, form or define a filtration zone 44 that actually increases during operation of the filter. The filtration path will be outside-inside with solids collecting on the outside of the filter media on the submerged portions 22 of the filter media. As a solids layer builds, the water level in filter tank 2 will increase submerging more active filter media. At a predetermined maximum water depth 4 or time interval, the wet, solids-laden filter media is cleaned by:

1. Energizing an air suction device 30 capable of handling an air and water mixture through a cleaning conduit 28 and one or more cleaning member apparatus 26 (similar to dental suction or wet/dry vacuums or "shop-vacs").
2. Rotating filter drum 20 (or discs in accordance with other embodiments) to unsubmerge the fouled media and clean the media of collected solids and remove entrapped water from the media employing one or more suction cleaning apparatus 26, and which further cleanse the media with ambient gases (air) from the clean side (inside) of the non-submerged portion 24 of the filter media. The filter media may be cleaned with multiple passes and/or with numerous apparatus 26 in sequence. Apparatus 26 may optionally be supported by support struts 34, 36, illustrated in phantom in FIG. 1.

3. If desired, the fouled media maybe treated with cleaning agents (which may be liquid, gas, aerosol, or combinations thereof) as a part of the filter media cleansing process, employing a cleaning composition applied from a cleaning composition supply vessel 14, cleaning composition supply conduit 16 and supply valve 18. Conduit 18 includes, in certain embodiments, one or more spray nozzles 17 attached to a spray bar 19. There may of course be less or more nozzles than illustrated, and they need not be evenly spaced, or even in the same line along the spray bar. The spray bar itself may not be necessary, as one could conceive of embodiments where the nozzles are each individually attached to the cleaning apparatus of the present disclosure, or not attached but held in position by dedicated brackets. In certain embodiments the spray bar and nozzles may be positioned aft of the the cleaning apparatus of the present disclosure member, but that is not required in all embodiments. The aft position appears to work best for the cleaning solution to be applied post extraction of fluid so the applied cleaner agents are not diluted and are able to wick and penetrate the depth of the media. This may prove especially useful in applications that may sometimes see oil and grease (which is a problem at some plants) as well as for behind fixed film biological treatment plants such as MBBR and Trickling filters as those sorts of bacterial films tend to attach to and grow on the filter media too. Being able to extract free liquid and kill/sterilize those sorts of highly adherent bio-films with a low waste volume generating process will be a large step forward for this type of filtration.

In contrast to previously known apparatus, systems and processes, the initial cleaning media is air (a gas), not filtered water (a liquid); applied suction (reduced pressure) is used, applied directly to the soiled side or portion of the filter media which is non-submerged. This is not, therefore, a 'backwash' but a unique cleaning arrangement suitable for use with any filter media type (for example, but not limited to woven mesh, nonwoven, pile fabric, knitted fabric, felt). Moreover, the arrangement allows for direct access to the non-submerged 'dirty—feed side' of the media for cleaning and/or application of cleaning agents (for example, but not limited to, oxidizers, biocides, surfactants, acids, bases, chelating agents, solvents, steam, or combination thereof) as a part of the cleaning process.

In certain system and process embodiments, it may be desirable to operate the drum filter or filter disks, while filtering, 'fully submerged' and then periodically partially drain the filter tank, followed by initiating a cleaning event to clean non-submerged portions of what then becomes partially submerged filter media, but only during one or more cleaning events or cycles. In these embodiments the one or more cleaning apparatus of the present disclosure would either be submerged during filtering, but become non-submerged when the tank level is decreased; alternatively, the cleaning apparatus may be movable so that they could be moved to a non-submerged position away from the filter drum or filter disks, and then moved into position to clean the fouled filter media after the tank level is decreased sufficiently. These embodiments are considered within the present disclosure. Another advantage of apparatus, systems and methods of this disclosure is the fact that they are not subject to run dry interruption. With fully submerged filters if a low flow, high solids event is experienced the filter backwash rate can exceed the forward feed rate and create a low-level shut down of the backwash pump to prevent running dry which can be problematic for the process should it be followed by a hydraulic surge (such as a lift station pump kicking on). Apparatus, systems and processes of the present disclosure have the ability to clean the media with no forward flow, but also the ability to completely clean and nearly dry the media in an empty tank should one wish to clean the media for long periods of non-use which is sometimes the case for storm water applications. Otherwise the media sits in water or fully saturated either of which causes biomass to grow in and on the filter media without the ability to remove it.

Other system and process embodiments are contemplated and are considered within the present disclosure, for example, but not limited to, those embodiments disclosed in detail in our copending '645 application, with the addition of one or more apparatus of the present disclosure. In each embodiment, influent enters and effluent leaves the unit in substantially the same fashion, with only the filter media cleaning mechanisms being different, and embodiments where one or more drum filter elements are employed and embodiments where one or more filter disks are employed.

FIGS. 2-6 are schematic illustrations of various views of three apparatus embodiments in accordance with the present disclosure. Embodiment 200 illustrated schematically in FIG. 2 includes a rectangular box 88 having a leading surface 82 and a trailing surface 86. Leading surface 82 has a row of six obstacles 80 (sometimes referred to herein as chicanes, baffles, or nubbins) evenly spaced and removably attached thereto, in this embodiment by adhesive, while trailing surface 86 has a row of five obstacles 84 evenly spaced and removably attached thereto. Two guides 90 are adhered with adhesive to both leading surface 82 and trailing surface 86, each guide 90 positioned at respective ends of the apparatus. Suction opening 92 is also present, in this embodiment a single slot suction opening having a slot length Ls that is about 90 percent of the length L of the apparatus. It should be noted that in embodiment 200, obstacles 84 are offset from obstacles 80, meaning that pile fibers will remain substantially upright when passing by obstacles 80, but then will encounter obstacles 84 where they will be temporarily flattened, except near guides 90.

Figure 3:
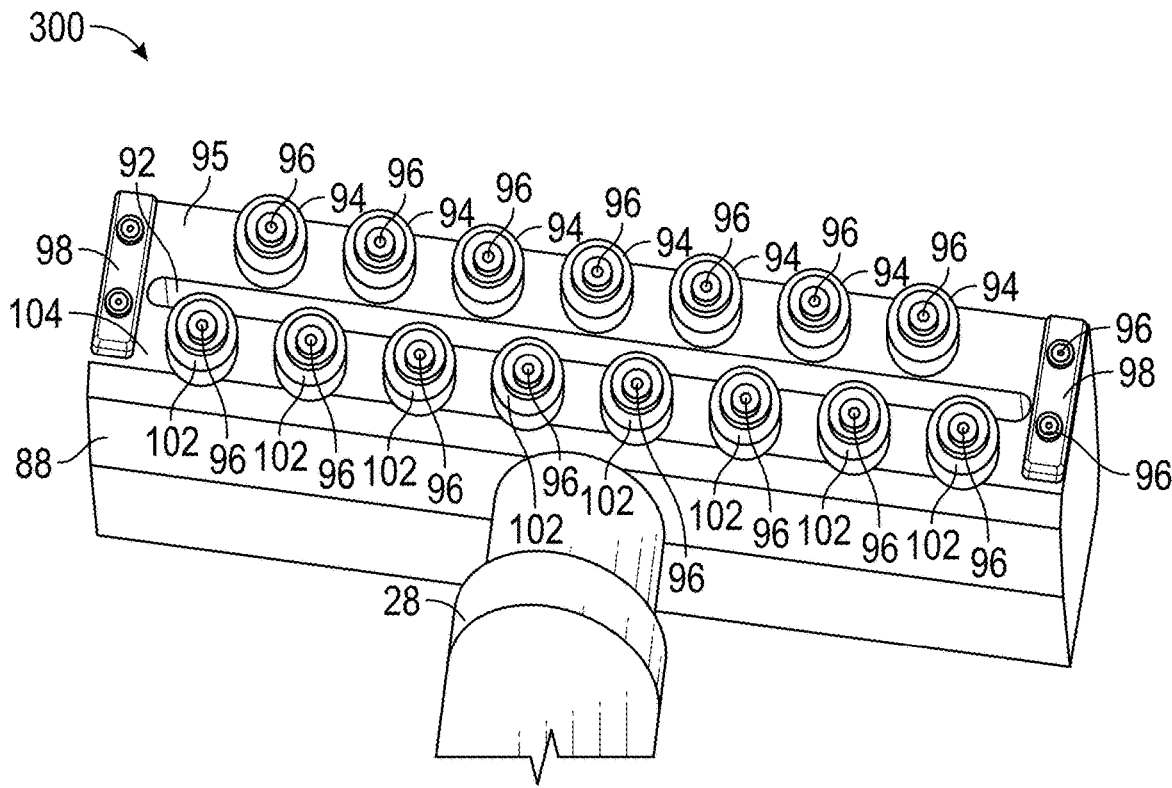

Referring now to embodiment 300 schematically illustrated in FIG. 3, embodiment 300 is similar to embodiment 200 but rather than having leading obstacles 94, trailing obstacles 102, and guides 98 adhered to leading surface 95 and trailing surface 104, these obstacles are removably attached using machine screws 96. In the embodiments illustrated in FIGS. 2 and 3, all components may be plastic, such as PVC, or metal such as carbon steel or stainless steel, or aluminum if weight is a consideration. Some other exotic metal may also be used in corrosive environments, such as brass, copper, or monel.

Figure 2A:
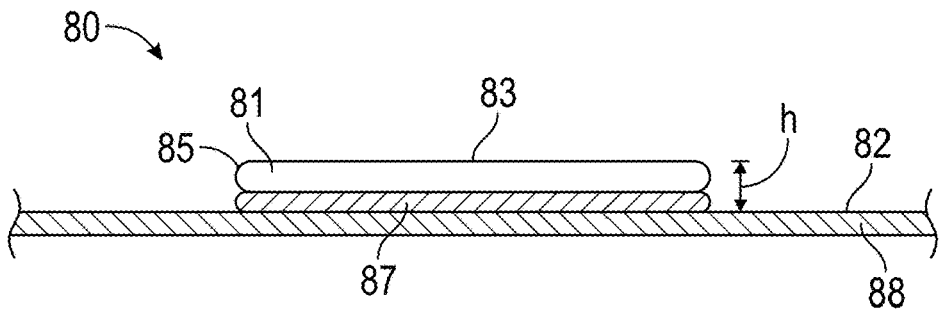
FIGS. 2A, 2B, and 3A are schematic cross-sectional views of three embodiments of obstacles.
Figure 2B:
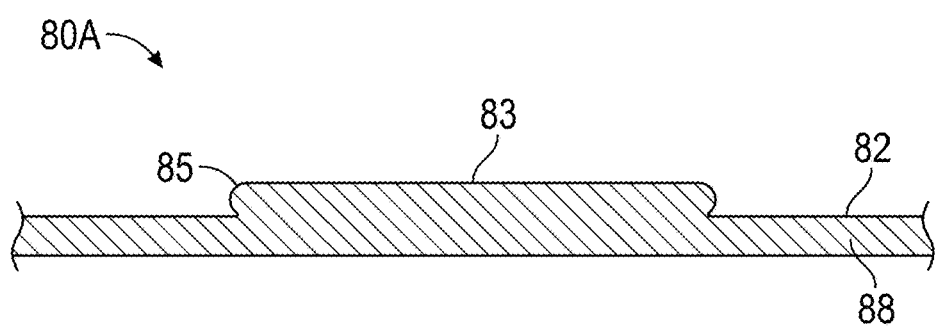
Figure 3A:
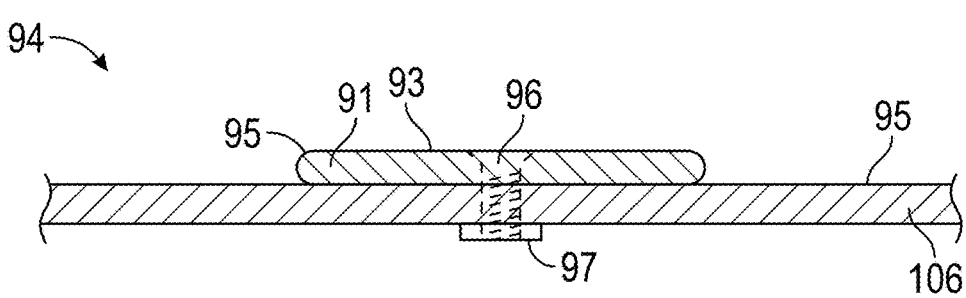
Figure 7:
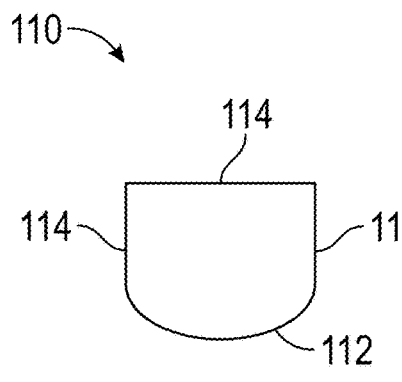
FIGS. 7, 8 and 9 are plan views of three other embodiments of obstacles useful in apparatus, systems, and processes in accordance with the present disclosure.
Figure 8:
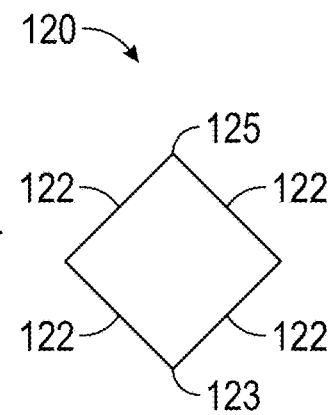
Figure 9:
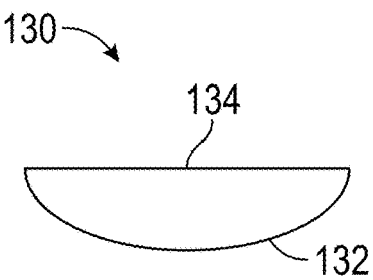

FIGS. 2A, 2B, and 3A are schematic cross-sectional views of three embodiments of obstacles useful in apparatus, systems, and processes in accordance with the present disclosure. Obstacle 80 illustrated schematically in cross-section in FIG. 2A features a disc-shaped body 81, a substantially flat primary surface 83, and an arcuate side surface 85. A layer of adhesive 87 is illustrated in exaggerated thickness, adhering a lower surface of obstacle 80 to leading surface 82 of rectangular body 88. Adhesive may be used for plastic and metal obstacles. Metal obstacles may alternatively be adhered using welding or brazing to a metal leading or trailing surface of a metal rectangular box. As another alternative, as illustrated schematically in FIG. 2B, obstacle 80A may be formed as part of rectangular box 88, such as molded metal or plastic, or machined metal or plastic. As yet another alternative, as illustrated schematically in FIGS. 3 and 3B, obstacle 94 includes a disc-shaped body 91, a substantially flat primary surface 93, and an arcuate surface 95, and may be removably attached to rectangular box 106 using a machines screw 96 and a nut 97.

and FIGS. 7, 8 and 9 are schematic plan views of three other embodiments of obstacles useful in apparatus, systems, and processes in accordance with the present disclosure. Embodiment 110 has an irregular polygonal shape, having an arcuate leading edge 112 and three straight edges 114. Embodiment 120 has a regular polygonal shape, having four straight edges 122, and positioned so that in operation a vertex 123 leads and a vertex 125 trails. Embodiment 130 has a two-sided irregular polygonal shape, having an arcuate leading edge 132 and a straight trailing edge 134. Other chicane, baffle, or nubbin shapes not illustrated are considered suitable for use in apparatus, systems, and processes, of the present disclosure, the primary function being to route at least some particles around the obstacles during a filtering operation.

Figure 4:
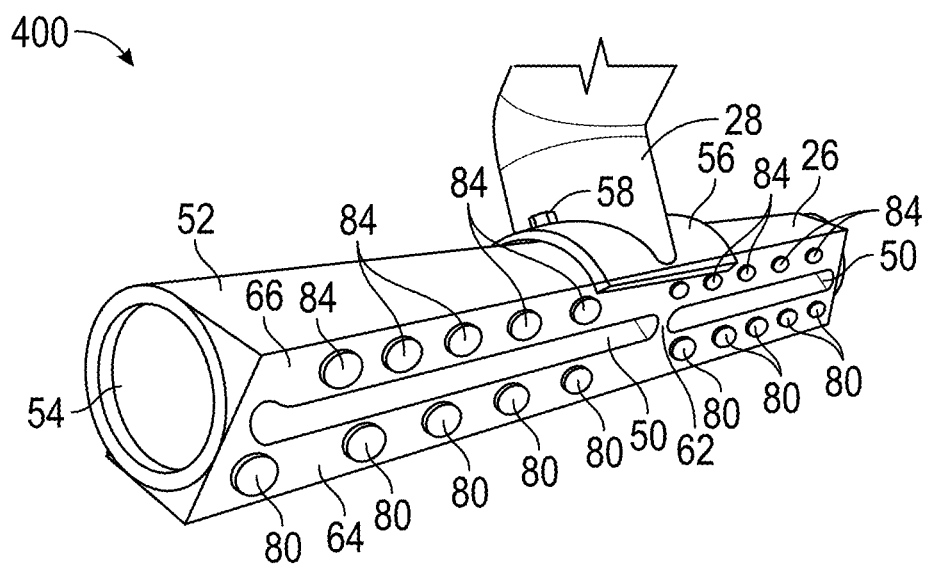
Figure 5:
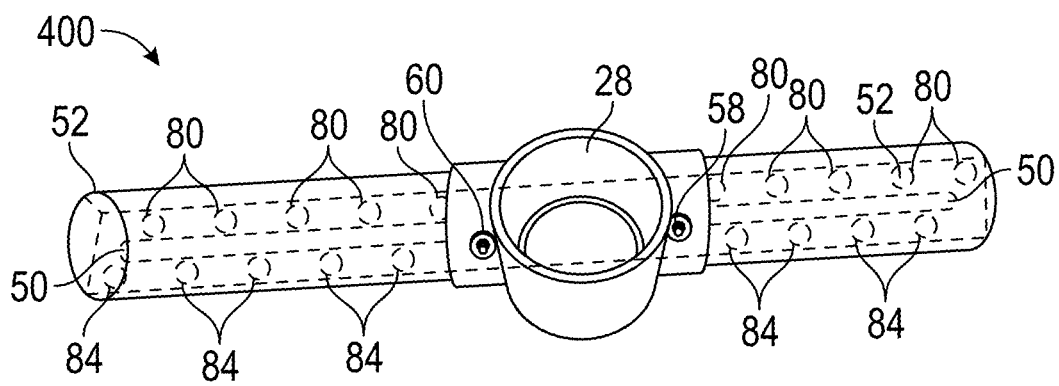
Figure 6:
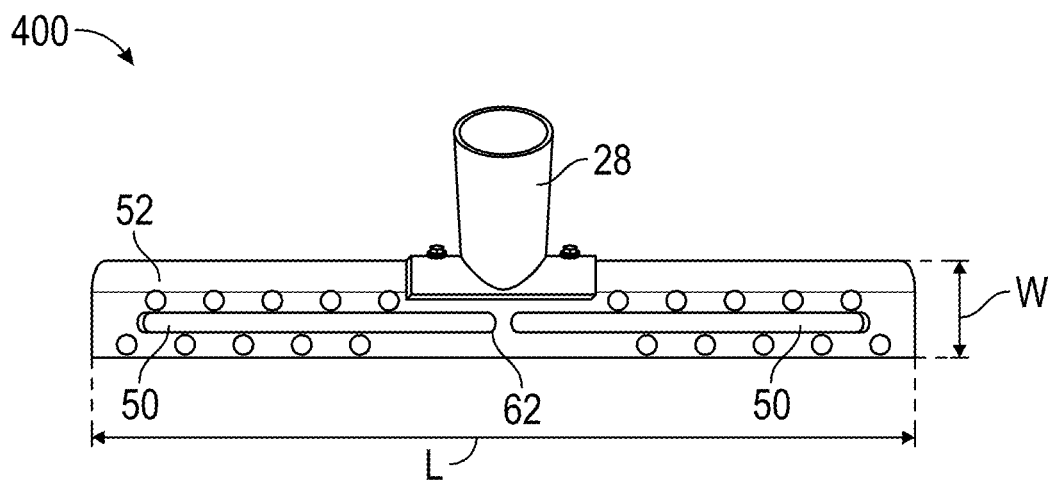

FIGS. 4, 5, and 6 are schematic illustrations of various views of another embodiment 400 of a cleaning head apparatus in accordance with the present disclosure. Cleaning head apparatus 26 comprises a body 52 having a length (L) and a width (W), the body formed to include a leading surface 64 and a trailing surface 66 having adhered thereto a first row of chicanes 80 and a second row of chicanes 84 respectively, and having two longitudinal suction slots 50 separated by a central bracket 62. Body 52 is generally cylindrical in this embodiment, but that is not necessary in all embodiments, nor need slots 50 be longitudinal in all embodiments. For example, slots 50 could be a series or pattern of smaller slots, or even round or other shape holes. Body 52 includes two end caps 54 at its opposite ends (one is not viewable in FIGS. 4-6). A half- or quarter-cylindrical bracket 56 is attached with two screw/washer assemblies 58, 60, and this bracket fluidly and mechanically connects body 52 with cleaning conduit 28. In the embodiment illustrated in FIGS. 4-6, all components except the screw/washer assemblies 58, 60 may be plastic, such as PVC, or metal such as carbon steel or stainless steel, or aluminum if weight is a consideration. Some other exotic metal may also be used in corrosive environments, such as brass, copper, or monel.

Figure 10:
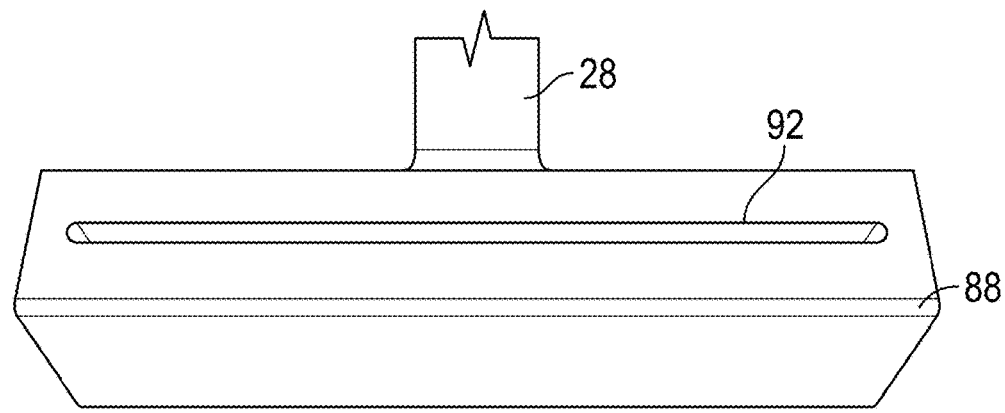
FIG. 10 is a photographic schematic perspective view of a currently known cleaning head apparatus.

FIG. 10 is a photographic schematic perspective view of a currently known cleaning head apparatus.

Figure 11:
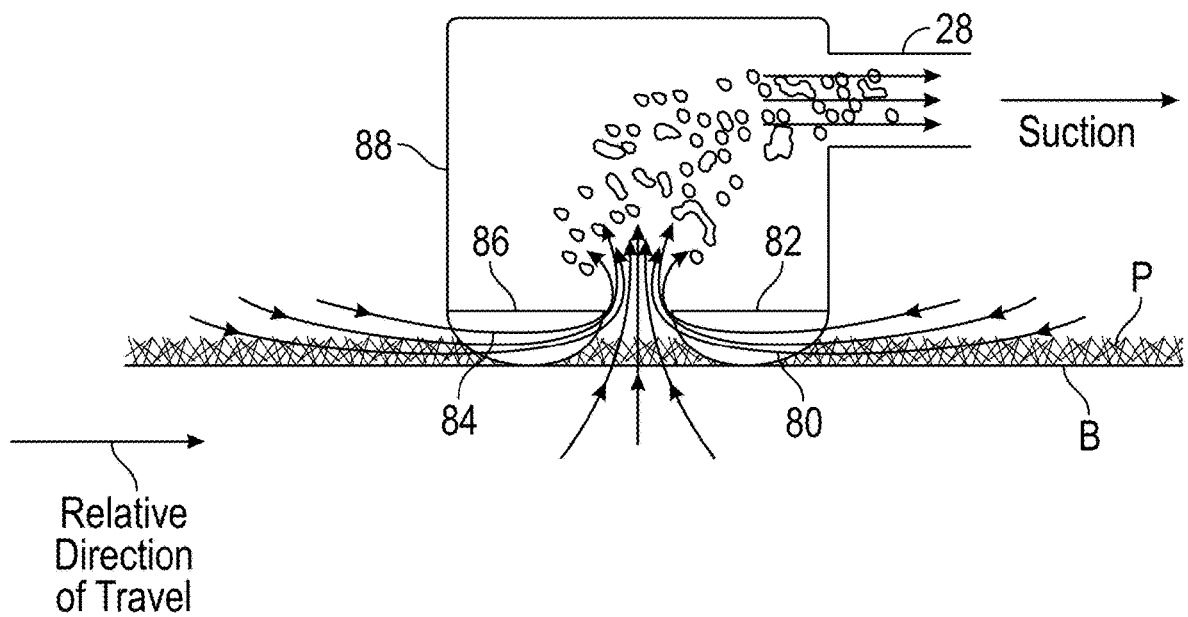
FIG. 11 is a schematic side elevation view, partially in cross-section, of one embodiment of a cleaning head apparatus in use, illustrating how apparatus of the present disclosure are effective in producing three mass transfer mechanisms.

FIG. 11 is a schematic side elevation view, partially in cross-section, of one embodiment of a cleaning head apparatus of the present disclosure, illustrating how apparatus of the present disclosure are effective in producing three mass transfer mechanisms. Assuming the cloth filter media is stationary and has a backing B with pile fibers P, the cleaning head apparatus move from left to right. When used in this fashion, tangential parallel mass transfer of particles is achieved, as indicated schematically by the curved arrows to the left of the cleaning head near the pile fibers; perpendicular counter flow mass transfer of particles is achieved as indicated schematically by the curved arrows pointing generally upward through the suction slot; and tangential counter flow mass transfer of particles is achieved as indicated by the curved arrows to the right of the cleaning head near the pile fibers.

Figure 12:
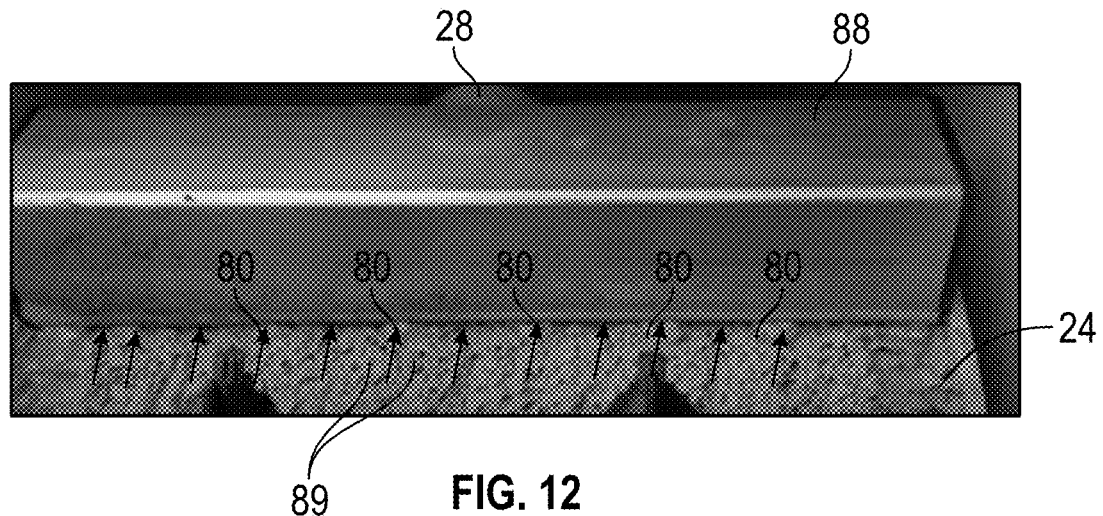
FIGS. 12 and 13 are photographs comparing an apparatus of the present disclosure with a currently known apparatus while in use.
Figure 13:
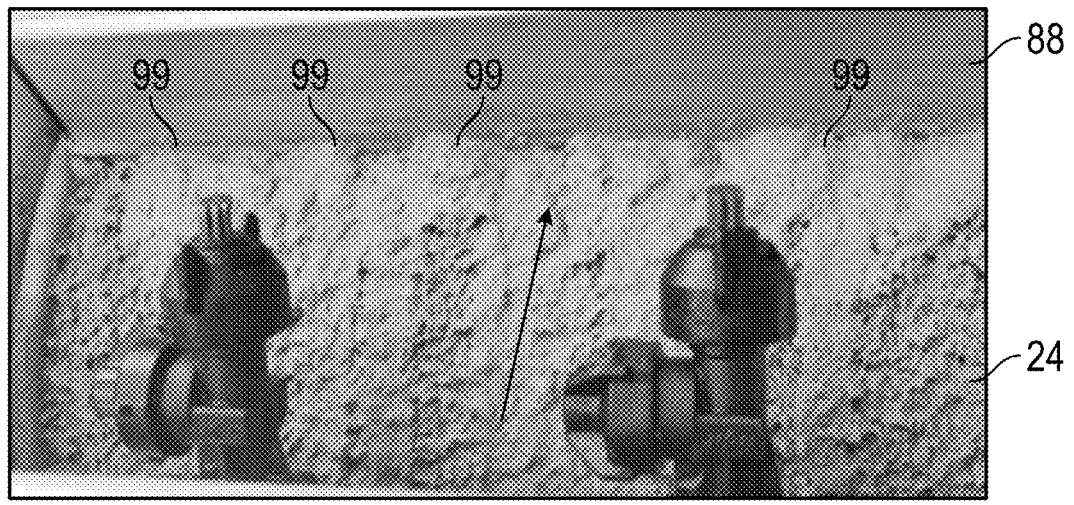

FIGS. 12 and 13 are photographs comparing an apparatus of the present disclosure (FIG. 12) with a currently known "flat-faced" apparatus (as in FIG. 10) while in use where the cleaning head apparatus operates when the filter media is partially non-submerged. The arrows in FIG. 12 indicate the movement of particles 89 under the cleaning head and around chicanes 80; chicanes 80 maintain open spaces therebetween, allowing tangential parallel cleaning action on the forward side of cleaning head apparatus of the present disclosure. Note the small divergence of solids parting around the chicanes as they are routed under the apparatus leading edge. In contrast, as may be seen at 99 in FIG. 13, a prior art flat faced cleaning head operating in a non-submerged application, some collected solids are "squeegeed" out of the filter cloth ahead of the leading edge of the prior art device and not removed via the cleaning head.

Figure 14:
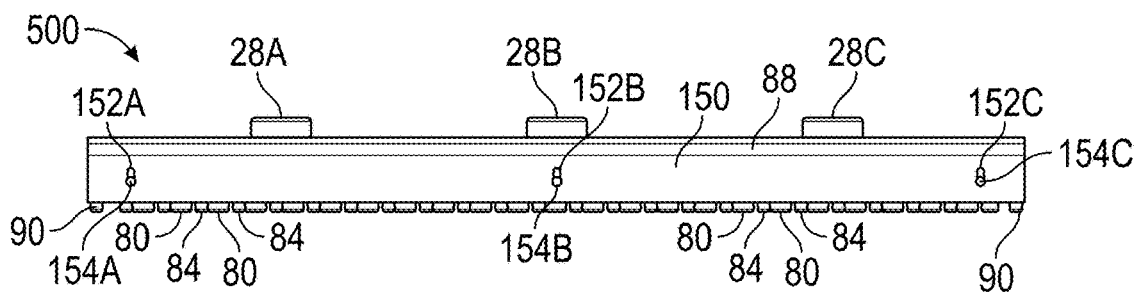
Figure 15:
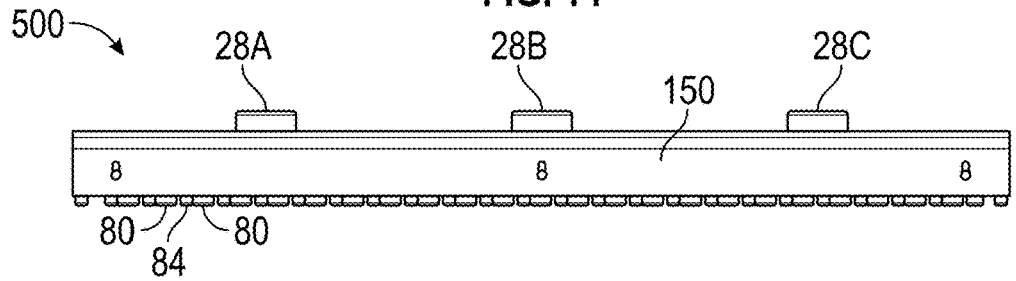
Figure 16:
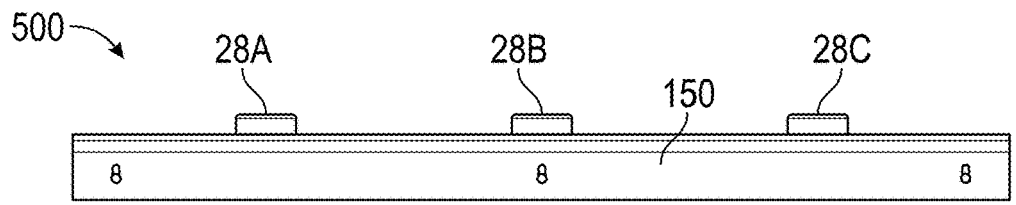

FIGS. 14-17 are schematic illustrations of various views of two other apparatus embodiments in accordance with the present disclosure. Embodiment 500, as illustrated schematically in FIGS. 14, 15, and 16, includes three suction cleaning conduits 28A, 28B, and 28C, and features an adjustable blade or gate 150 on the leading face of rectangular hollow body 88. FIG. 14 depicts the adjustable blade 150 in the fully retracted position, while in FIG. 15 the blade is half-retracted, and FIG. 16 depicts the adjustable blade 150 as fully extended. As may be seen, chicanes 80 and 84 may be fully presentable to the filter media, not presentable at all, or may be somewhat presentable to the filter media, as the need arises. Adjustable blade 150 height may be adjusted by a variety of devices. In embodiment 500, three slots 152A, 152B, and 152C operate in conjunction with three corresponding adjustment screws 154A, 154B, and 154C.

Figure 17:
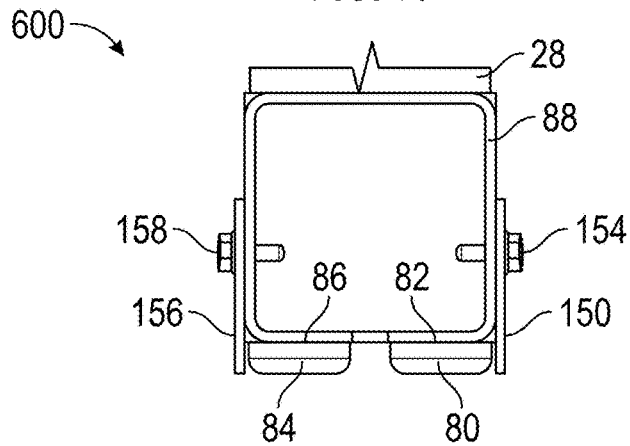

FIG. 17 illustrates schematically embodiment 600, which features both leading and trailing adjustable blades 150, 156, with height adjusted using screws 154, 158, respectively.

Figure 18:
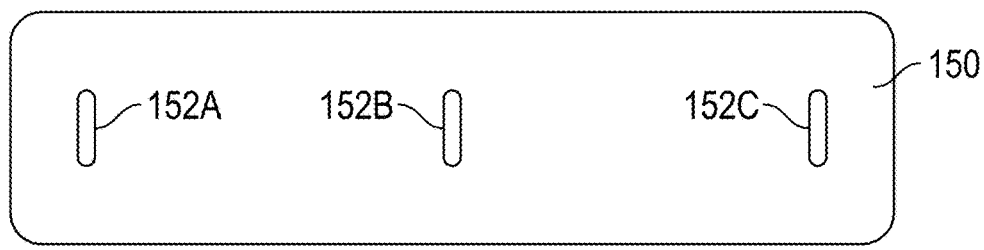
FIG. 18 is a schematic plan view of an adjustable blade or gate useful in certain embodiments of the present disclosure.

FIG. 18 is a more detailed schematic plan view of an adjustable blade or gate 150 useful in certain embodiments of the present disclosure. The adjustable blade or gate may be heightened or shortened against the profile of the chicanes to modify the open clearance available for tangential cleaning fluid flow. The gate or blade may have a flat, toothed, wavey or other nonstraight edge. The gate or blade maybe rigid or flexible.

As described in our copending '634 application, filter drums useful in the systems and processes of the present disclosure typically comprise a pile cloth filter media and filter drum heads, an axle assembly, and a screen support that supports pile cloth filter media. Filter drums may also include threaded end rings that mesh with threads on the filter drum heads, and integrated or non-integrated rotating pipe. Certain embodiments may include inserting one end of the drum axle into a pillow block, however, it is contemplated that certain embodiments will employ two rotating pipe couplings (one on each end of the filter drum without an axle and pillow block) to convey filtrate from both ends of the filter drum as this will allow use of smaller couplings vs. enlarging the size of the pipe to handle the filtrate flow at reasonable velocities. This aides in maintaining a small foot print in certain embodiments. Filter drum drivers may be a chain drive, a belt drive, or other mechanism. To produce the suction required, certain embodiments may employ a suction tank enclosure or frame in which a suction receiver tank is positioned. One or more suction unit motors may be positioned on a top of the suction tank enclosure, with a T-connector/suction manifold fluidly and mechanically connecting the suction motor(s) to the cleaning conduit 28 via a quick-connect/quick-disconnect (QC/QD) connector.

The cleaning member apparatus, obstacles, and systems illustrated schematically in the various figures comprise several non-limiting examples. Other configurations are possible, depending upon the specific design parameters. With regard to the cleaning member(s) apparatus and obstacles, the embodiments illustrated schematically in FIGS. 2, 2A, 2B, 3, 3A, and 4-9 are just examples that could take on additional forms including:
- various shapes, widths, rows of openings from the exterior to interior;
- various shapes, widths, and height of obstacles, including two or more different shaped obstacles in the same row, or random, non-row positions;
- various cross-sectional shapes of apparatus body, such as regular polygonal shapes (for example triangular) and irregular polygonal shapes;
- having regular shaped (for example toothed, wave patterned) or irregular shaped edges of adjustable blades to groom cleaned media;
- having an installed vacuum relief valve in the cleaning head apparatus or suction manifold to prevent exceedance of a maximum vacuum;
- having an integrated cleaning solution dispersing bar.

Any combination of the above features may be present. As those skilled in this art will readily appreciate, there are countless variations possible and the embodiments herein are simple and effective—but not optimized.

With respect to the integrated and nonintegrated rotating pipe couplings, the inventors herein have not found suitable commercially available options that suits the purpose of conveying filtrate from the interior of the filter drum (or filter disks) while sealing clean water from dirty water while rotating submerged. There are some items available from the oil industry but they are designed for hundreds of psi pressure, are extremely costly, and are not intended for submerged use. The embodiments described herein and in our copending '645 application are adequate, very simple, and extremely low cost for submerged low/no pressure application.

Reduction of Filter Media Stretching/Wear:
One challenge of utilizing cloth filter media is the tendency of the filter media to stretch, deform, and elongate over time with use.

Flat-faced full contact cleaning heads hold the filter media in place on both sides of the cleaning slot creating a very high level of suction which pulls and stretches the cloth in the direction of the travel. While localized to the cleaning slot, the suction force is extremely strong and there is no means of control or adjustment other than manipulation of the cleaning pump.

Single-sided cleaning heads, such as those described in U.S. Pat. No. 8,048,296, hold the cloth media in place on one side, but rely solely on hydraulic flow on the non-contact side to hold the media down. Unfortunately, the concept of backwash involves reverse flow at a velocity higher than the forward velocity of water and hence the cloth media gets lifted from the frame due to the lack of mechanical intervention.

The "chicaned" cleaning heads of the present disclosure minimize filter media stretching and wear in numerous manners:
- provide mechanical retainage of the cloth media on both sides of the suction openings;
- utilize both tangential and perpendicular cleaning directions with tangential cleaning on the leading and aft (trailing) edges; by partially cleaning the cloth in a tangential manner prior to the suction opening(s), the filter media becomes more permeable, opening flow channels somewhat prior to the perpendicular cleaning;
- this in turn reduces the force of the suction or net vacuum on the cloth media which in turn reduces stretching;
- allow for a sufficient flow of cleaning fluid (air or water) from the interior of the filter drum (or discs) to create a net vacuum pressure inside of the filter drum (or discs) which in turn tensions the cloth media to the drum or discs preventing overall stretch of the media across the length of the cloth.

Adjustable Velocities/Seals for Tangential Mass Transfer:
Current cleaning head designs operate with static, fixed dimension clearances which influence the velocities of the backwash medium. While the volumes of backwash medium maybe adjusted to influence cleaning fluid velocities which are proportional to cleaning efficiencies, the cleaning heads themselves offer no means independently or in conjunction with other components of the filter to optimize the application of backwash fluids.

In contrast, the "chicaned" cleaning head apparatus of the present disclosure offer numerous opportunities to influence and optimize the use of cleaning fluids to achieve a maximum removal of foulants with a minimal volume of waste material.

Methods of adjusting velocities, or void spaces for cleaning fluid flow, with the novel "chicaned" cleaning shoe apparatus include the following:

Adjusting Dimension or Density of Obstacles (Chicanes, Baffles, Nubbins):
- manipulating the depth or height of the obstacles to increase or decrease clearance between the fouled cloth media and the suction port(s) on the cleaning head apparatus;
- manipulating the dimensions (width, length, radius) of the obstacles to increase or decrease clearance between obstacles;
- manipulating the density of the obstacles to increase or decrease clearance between obstacles;
- manipulating the density of the obstacle placement, individually, by row or column, or random placement to increase or decrease clearance between obstacles.

Cloth Media Manipulation:
- increasing or decreasing the average height, whether uniform or variable, of the pile/fiber of the cloth media;
- increasing or decreasing the weight or density of the cloth media.

Use of a Flow Control Gate:
- cleaning heads of the present disclosure may be fitted with an adjustable blade or gate that maybe heightened or shortened against the profile of the chicanes to modify the open clearance available for tangential cleaning fluid flow; the blade or gate may have a flat, toothed, wavey or other nonstraight edge, and may be rigid or flexible.

Use of Incompressible Fluid Cleaning Agent or Co-Agent:
- in applications utilizing non-submerged, air based, wet solids extraction cleaning methods, the novel chicaned cleaning heads maybe used in combination with a spray bar and pump to continuously apply an incompressible, typically liquid, fluid to block or partially block the void spaces between obstacles to influence velocities of cleaning fluid(s).

Apparatus, systems, and processes of the present disclosure enable the use of all media types (wire cloth, polymer mesh, pile cloth, woven cloth, felt, and other "deep" or "flat/thin" filter media) with an outside to inside filtration path and direct cleaning of the fouled side of the media. As used herein 'direct cleaning' means removal or extraction of wet solids from the filter media using one or more cleaning members without the cleaning members drawing filtered water through the filter media from the clean side to the fouled side, or using pressure washing to force filtered water through the filter media to dislodge accumulated solids and possibly damage the filter media. Apparatus, systems and processes of the present disclosure allow mechanical contact and level of 'suction' (or pressure reduction) engagement to be managed to not damage or reduce damage to typically frail, flat 'finer and absolute pore size' medias. As used herein, 'absolute pore size media' refers to the rating of the media, as more fully explained in our copending '645 application.

Certain apparatus, systems, and processes of the present disclosure offer partial and gradual additional submergence of the filter media as head levels in the filter tank increase due to solids build up on the filter media. Furthermore, certain apparatus, systems, and processes of the present disclosure are able to handle upset conditions that may cause (in conventional filters) sudden and rapid increase in solids loading due to upset upstream processes, all while employing reduced piping, reduced valve sizes, reduced power, and reduced related equipment foot print compared with presently available systems, and which may eliminate the need for freeze protection.

In certain embodiments, filter tank level (FTL) may be sensed, and used to control suction (reduced pressure) management of the cleaning members. Different systems and processes of the present disclosure may have different sensor strategies, for example, a mass flow sensor for the influent flow and a FTL sensor; or a TL sensor used to control energizing or initiating additional cleaning members of a system employing multiple cleaning members. All combinations of sensing one or more of FTL, temperature, turbity, concentration, particle count, and mass flow of one or more flowing streams and the influent in the filter tank are disclosed herein and considered within the present disclosure.

Certain systems may include FTL management components and associated components, for example, but not limited to pressure (or vacuum, or reduce pressure) control devices (backpressure valves), pressure relief devices (valves or explosion discs), level control valves, expansion valves, pipes, conduits, vessels, tanks, mass flow meters, temperature and pressure indicators, heat exchangers, pumps, compressors, and blowers as described herein. With respect to "reduced pressure management", when referring to the degree of vacuum or reduced pressure exhibited in the cleaning members, those skilled in the art will understand that the lowest degree of reduced pressure that will effectively clean the filter media is desired, for sake of energy efficiency, but the reduced pressure may, in some embodiments, be about 13 psia (90 kPa) or less; alternatively about 12 psia (83 kPa) or less; alternatively about 11 psia (76 kPa) or less; alternatively about 10 psia (69 kPa) or less; alternatively about 10 psia (70 kPa) or less; alternatively about 9 psia (63 kPa) or less; alternatively about 8 psia (56 kPa) or less; alternatively about 7 psia (49 kPa) or less; alternatively about 6 psia (42 kPa) or less; alternatively about 5 psia (35 kPa) or less. All ranges and sub-ranges (including endpoints) between about 14.69 psia (about 101.3 kPa) and about 0.01 psia (about 0.07 kPa) are considered explicitly disclosed herein. As used herein with respect to pressure reduction below atmospheric pressure, "about" means +/−1 psia (+/−6.9 kPa).

Certain systems of this disclosure include those wherein the one or more filtration members is a single drum filter. In certain of these drum filter systems, the one or more cleaning head apparatus is a single apparatus comprising a body having a length (L) and a width (W), the length (L) of the cleaning member corresponding substantially with a length of the drum filter (DFL). In certain drum filter system embodiments, the length (DFL) of the filter drum and a length of the filtration zone inside the filter tank (FTL) are related by a ratio ranging from about 1:2 to about 9:10. In certain other drum filter systems the one or more cleaning head apparatus may comprise a set of apparatus, each comprising a body having a length (L) and a width (W), a first sub-set of the set of apparatus positioned so that their combined length ($L_11+L_12+L_13+L_1n$) corresponds substantially with the length of the drum filter (DFL), and a second sub-set of the plurality of apparatus positioned behind the first sub-set such that a length ($L_2$) of each of the second sub-set overlaps a position where two of the first sub-set of apparatus have abutting ends. In yet other drum filter systems the one or more cleaning apparatus comprises first and second apparatus, each apparatus comprising a body having substantially same length (L) and a width (W), the length (L) of the first and second apparatus corresponding substantially with a length of the drum filter (DFL). It is understood herein that the term "length" is a larger numerical quantity than the term "width."

Certain systems and processes of the present disclosure may comprise a plurality of filter disks (or discs), where a "disk" or "disc" is a 3D circular structure having a radius (r) much more than its width (w). In certain systems each of the one or more filter disks has equal width (w) and radius (r). In certain disk filter embodiments the one or more cleaning apparatus may comprise a first set of cleaning apparatus, one of the first set of cleaning apparatus positioned on a first side of each of the plurality of filter disks, and a second set of cleaning apparatus, one of the second set of cleaning apparatus positioned on a second side of each of the plurality of filter disks. In other disk filter embodiments, the one or more cleaning apparatus may comprise a first set of cleaning apparatus, at least two of the first set of cleaning apparatus positioned on a first side of each of the plurality of filter disks, and a second set of cleaning apparatus, at least one of the second set of cleaning apparatus positioned on a second side of each of the plurality of filter disks.

The condition (clarity, turbidity, and/or concentration of an impurity) and flow rate of the influent stream and the specific configuration of the apparatus and system largely define the operational capabilities of each embodiment. Apparatus, systems, and processes of the present disclosure may be used for new greenfield applications, where one or more filter units are custom designed together to be operatively and fluidly connected during operation. It is also contemplated to design the systems and processes to be able to operate in dual modes, where in the first mode the filter filter unit is integrated with another process (such as a clarifier or membrane unit), and the second mode where one or both of the units may operate independently from each other, in other words, where either one or both of the filter unit unit and the clarifier or membrane unit may operate without requiring the other unit to be in operation.

Advantageously, installation of apparatus, systems, and processes of the present disclosure on existing clarifier or membrane units (or other separators, such as centrifuges) are expected to require minimal interfacing. It may be possible to design a retrofitted system that requires no modifications to the other units, although the designer may consider modest changes, for example, substituting less expensive membrane units, or other new internals for existing internals. New equipment to complete the integration of a system of the present disclosure may include vacuum (reduced pressure) conduits, a blower, and a pump, the filter tank, and the filter media (drum or one or more disks). It is of course contemplated to employ a drum filter of the present disclosure in conjunction with a disk filter of the present disclosure, such "compound" arrangements may be in series or parallel (or combination) configuration.

Systems of the present disclosure often are end of line (in other words downhill of the plant) in which case there is no pump at all and the entire until will be low power/solar capable. Embodiments where the blower discharge is used to 'pneumatically' rotate the drum or disk arrangement are contemplated, as are embodiments where the blower discharge is used to push or pump the small volume of waste uphill via an air-lift if needed. Other embodiments may be operated using hydraulic, electric, solar, geothermal, pneumatic, or combustion power, or combination of one or more of these. One possible configuration may employ traditional electric power to operate a motor for a pump (which motor may be variable speed or non-variable speed) and solar electric power to operate the reduced pressure generator (blower) and to operate the motor that rotates the drum or disk filtration members. Power supplies may have redundant and/or back up power supply. In certain embodiments, electric power may require installation of an additional battery unit, possibly including solar panels for backup power. In certain embodiments, a plant may have one or more hydrocarbon-powered electric generators, and these units may provide electric power, and backup power may be provided by an uninterruptible power supply (UPS) battery system.

Certain embodiments may include 1) low power electric connections for data transmission for sensors (e.g., pressure, temperature, tank level, mass flow indicators, particle counters, among others); and 2) electric cable to provide power for operating valves and other components of the systems and processes. With respect to data connection/integration, in certain embodiments control signals for the components of the systems of the present disclosure, as well as parameters measured or captured by the system's sensors, may be transmitted to and from an operator room or control room from and to the filter.

During operation of the systems of the present disclosure, one process for treating water or wastewater may comprise:
a) flowing an influent water composition comprising water and solids into the filter tank;
b) producing an effluent stream by generating a pressure differential across the submerged portions of the one or more filtration members, causing water in the influent water composition to flow from outside to inside submerged portions of filter media of the one or more filtration members (in certain embodiments the pressure differential is produced by gravity with the differential pressure being static head of the influent on the feed side of the filter media, while other embodiments may employ one or more pumps, or both gravity and pumping action);
c) rotating the one or more filtration members so that wet, solids-laden submerged portions of the one or more filtration members become non-submerged, wet, solids-laden filtration member portions; and
d) removing wet solids from at least some of the non-submerged, wet, solids-laden filtration member portions by reducing pressure in one or more non-submerged cleaning apparatus as described in the present disclosure, and wherein the non-submerged filter media from which wet solids have been removed is further cleansed of collected solids and entrapped water employing air drawn from inside of the one or more drum filters by the blower. In certain embodiments, the process may include periodic rotation of the media without cleaning to essentially load the entire surface of the filter media with solids before cleaning.

Another process for treating water or wastewater using a drum filter may comprise:
a) flowing an influent water composition comprising water and solids into the filter tank;
b) producing an effluent stream by generating a pressure differential across submerged portions of a filter drum, causing water in the influent water composition to flow from outside to inside submerged portions of the filter media of the filter drum;
c) rotating the filter drum so that wet, solids-laden submerged portions of the filter media become non-submerged, wet, solids-laden filter media portions; and
d) removing wet solids from the non-submerged, wet, solids-laden filter media portions by reducing pressure in one or more non-submerged cleaning apparatus as described in the present disclosure, and wherein the non-submerged filter media from which wet solids have been removed is further cleansed of collected solids and entrapped water employing air drawn from inside of the one or more drum filters by the blower.

Another process for treating water or wastewater using a disk filter may comprise:
a) flowing an influent water composition comprising water and solids into the filter tank;
b) producing an effluent stream by generating a pressure differential across submerged portions of one or more partially submerged filter disks, causing water in the influent water composition to flow from outside to inside submerged portions of the filter media of the one or more filter disks;
c) rotating the one or more filter disks so that wet, solids-laden filter media portions of the one or more fitter disks become non-submerged, wet, solids-laden filter media portions; and
d) removing wet solids from the non-submerged, wet, solids-laden filter media portions by reducing pressure in one or more non-submerged cleaning apparatus as described in the present disclosure, and wherein the non-submerged filter media from which wet solids have been removed is further cleansed of collected solids and entrapped water employing air drawn from inside of the one or more drum filters by the blower.

In certain embodiments, systems and processes of the present disclosure may include periodic rotation of the media without cleaning to essentially load the entire surface of the filter media with solids before cleaning.

Any known type of reduced pressure generation device (blower, Venturi eductor, wet/dry vac, or "shop vac") may be employed in practicing the systems and processes of the present disclosure, including those currently commercially available from Gast, Tuthil, Ametek, Gardner Denver, and others. Suitable filter tanks, drum filters, and disk filters would be custom fabricated. As noted herein a pump is normally not required, but if used, any known type of pump may be employed in practicing the systems and processes of the present disclosure, including positive displacement, centrifugal, horizontal, vertical pumps, and pumps operated with variable speed motors. Suitable conduits and components typically used therewith include currently commercially available stainless steel tubing, or PVC tubing available from a variety of sources, including Ryan Herco, JM Eagle, Charlotte Pipe, Cresline, and others. Any known type of mass flow meter may be employed in practicing the systems and processes of the present disclosure. Suitable mass flow meters and components typically used therewith include the coriolis flow and density meters currently commercially available from Emerson (under the trade designation ELITE Peak Performance Coriolis Flow and Density Meter) and other suppliers. Any known type of filter tank level control sensor (float, laser, or other) may be employed in practicing the systems and processes of the present disclosure.

Any known type of filter media may be employed in practicing the systems and processes of the present disclosure, including but not limited to pile fabrics, wire mesh, polymer mesh, woven and nonwoven fabrics, felts, stitch-bonded fabrics, and the like. Suitable filter media include those described in U.S. Pat. Nos. 1,833,315; 4,167,482; 4,639,315; 4,869,823; 5,560,835; 5,346,519; and 8,852,445.

As explained in the '445 patent, cloth disk filters are sized on the basis of "hydraulic loading rate", and 3 to 6 gallons/day/ft$^2$ (gpd/ft$^2$) is typical for design average flow rates of prior art cloth disk filters. Certain embodiments of the present disclosure are in fact operating well above this range, up to 12 and even 16 gpd/ft$^2$, depending on pollutant loading.) Filter cloth media useful in the various embodiments of this disclosure may, in certain embodiments, be able to filter out solids having particles sizes of 10 microns or larger, or 5 microns and larger, and withstand washing or mechanical abrasion enough to remove retained materials, and may be characterized as organic polymeric filter cloth media or inorganic filter cloth media depending on the material performing the separation function. A single disk or cassette of a cloth disk filter may have a filter area ranging from 1 to about 200 ft$^2$, or from 1 to about 50 ft$^2$, or from 1 to about 20 ft$^2$, and there may be upwards of 10 filter cassettes in a single combined sludge blanket/filtration vessel. The filter area is dictated largely by the filtration task at hand, size of the vessel and influent solids loading and flow rate, and the like. It is understood that an organic filter cloth media might comprise inorganic materials, and vice versa.

Suitable cloth filter media may be woven or nonwoven, and may comprise one layer or may be multi-layered. The material selected for the filter cloth media should have numerous attributes that render the filter cloth media suitable for filtration service, such as structural integrity to withstand the pressure gradients of filtration and backflushing, and chemical resistance to attack or dissolution by the filtered species, filtrate, and chemical cleaning solutions such as chlorine, citric acid, sodium hydroxide, and other chemicals designed to minimize organic and inorganic fouling of the filter cloth media. The material should also have the ability to be fabricated readily into the preselected filter cloth media shape for a particular application. One useful cloth filter material is a nonwoven, needlefelted nylon (polyamide) fiber-based material. The same material in "pile" form (sometimes referred to as knitted fabric) is another suitable filter material. "Pile" and "needlefelting", and "needling" are terms of art in the manufacture of nonwovens, and are readily understood by those skilled in the nonwovens art. Piled materials may also be needlefelted. Additional design criteria and considerations in the fabrication and selection of cloth disk filter media are disclosed in Purchas and Sutherland, "Handbook of Filter Media", Elsevier Science Ltd. (2002), which is incorporated herein by reference, and especially Chapters 2 and 3 entitled "Woven Fabric Media" and "Nonwoven Fabric Media", respectively. Patents describing piled and/or needled nonwovens include U.S. Pat. Nos. 3,673,048 and 3,755,055, both incorporated herein by reference. In certain embodiments, the filter material may comprise membrane materials or fine screened mesh (such as stainless steel screen mesh).

During certain processes of the present disclosure, one or all of filter tank level; temperature, mass flow rate, concentrations (or percentages of set point values) of selected constituents of influent and/or effluent; and reduced pressure value of one or more cleaning apparatus, and other parameters may be displayed locally on one or more Human Machine Interfaces (HMI), such as a laptop computer having a display screen having a graphical user interface (GUI), or handheld device, or similar, either in a dedicated control room, or remotely. In certain embodiments the HMI may record and/or transmit the data via wired or wireless communication to another HMI, such as another laptop, desktop, or hand-held computer or display. These communication links may be wired or wireless.

The filter tank, drum filter (heads, media support structure), disk filters, cleaning apparatus, obstacles (chicanes/baffles/nubbins), conduits, valves, and spray nozzles, may be made of metals, polymeric materials (for example, but not limited to, polypropylene, PVC, fiber-reinforced plastic (FRP)), except where felt or fabric seals, or rubber or other polymeric materials and/or seals may be employed. Suitable metals include stainless steels, for example, but not limited to, 304, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Texas) Use of high strength steel and other high strength materials may significantly reduce the wall thickness required, reducing weight. Threaded connections may eliminate the need for $3^{rd}$ party forgings and expensive welding processes—considerably improving system delivery time and overall cost. It will be understood, however, that the use of $3^{rd}$ party forgings and welding is not ruled out for system components described herein and may actually be preferable in certain situations. The skilled artisan, having knowledge of the particular application, pressures, temperatures, and available materials, will be able design the most cost effective, safe, and operable system components for each particular application without undue experimentation.

One or more control strategies may be employed, as long as the strategy includes measurement of filter tank level and (optionally) vacuum (reduced pressure); measurements to be able to determine influent and effluent properties (such as turbidity, particle counts, particle sizes, concentrations, and the like) and flow rates are preferred, and those measurements (or values derived from those measurements) may be used in controlling the systems and/or processes described herein. A pressure process control scheme may be employed, for example in conjunction with the filter tank level control devices and mass flow controllers. A master controller may be employed, but the disclosure is not so limited, as any combination of controllers may be used. Programmable logic controllers (PLCs) may be used.

Control strategies may be selected from proportional-integral (PI), proportional-integral-derivative (PID) (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The electrical connections, if used (voltage and amperage) will be appropriate for the zone rating desired of each system. In certain embodiments one or more electrical cables may be run and connected to an identified power supply at the work site to operate the HMI filter unit motor, pump and pressure reducing device. Certain embodiments may employ a dedicated power supply. The identified or dedicated power supply may be controlled by one or more logic devices so that it may be shut down. In exemplary embodiments, systems of the present disclosure may have an electrical isolation (lockout) device on a secure cabinet.

In embodiments where connection to one or more remote HMI units is desired, this may be achieved by an intrinsically safe cable and connection to allow system components to operate in the required zoned area. If no remote access is required, power to operate the HMI, motor, pump, and pressure reducing device may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) processes). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

In certain embodiments, internal algorithms in the logic device, such as a PLC, may calculate a rate of increase or decrease in water level inside the filter tank, or increase in pressure differential across filter media. These may then be displayed or audioed in a series of ways such as "percentage to cleaning" lights or sounds, and the like on one or more GUIs. In certain embodiments, an additional function within an HMI may be to audibly alarm when the calculated tank water level and/or pressure differential across the filter media rate of increase or decrease reaches a level set by the operator. In certain embodiments this alarm may be emitted locally, as well as remote from the filter system, for example in a local or remote control room.

Apparatus, systems of the present disclosure, including conduits therefore, cleaning apparatus, obstacles, pressure reducing devices, pumps, logic devices, sensors, valves, and optional safety shutdown units should be capable of withstanding long term exposure to probable liquids and vapors, including hydrocarbons, acids, acid gases, fluids (oil-based and water-based), solvents, brine, anti-freeze compositions, hydrate inhibition chemicals, biocides, chlorine, and the like, typically encountered in water and wastewater filtering and treatment facilities.

In alternative embodiments, some or all of the system may be enclosed within a frame or cabinet, and/or truck-mounted, and/or ship-mounted. Moreover, the various components (such as the filter tank) need not have specific shapes or specific conduit routing as illustrated in the drawings, but rather could take any shape, such as a box or cube shape, elliptical, triangular, prism-shaped, hemispherical or semi-hemispherical-shaped (dome-shaped), or combination thereof and the like, as long as the system performs the desired separation. The conduit cross-sections need not be round, but may be rectangular, triangular, round, oval, and the like. It will be understood that such embodiments are part of this disclosure and deemed with in the claims. Furthermore, one or more of the various components may be ornamented with various ornamentation produced in various ways (for example stamping or engraving, or raised features such as reflectors, reflective tape), such as facility designs, operating company designs, logos, letters, words, nicknames (for example AQUAPYR, and the like). Components of the systems may include optional hand-holds, which may be machined or formed to have easy-to-grasp features for fingers, or may have rubber grips shaped and adorned with ornamental features, such as raised knobby gripper patterns.

From the foregoing detailed description of specific embodiments, it should be apparent that patentable apparatus, systems, combinations, and processes have been described. Although specific embodiments of the disclosure have been described herein in some detail, this has been done solely for the purposes of describing various features and aspects of the systems and processes and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to modify or retrofit an existing water or wastewater treatment facility to include one or more apparatus and/or systems of this disclosure, or modify a fully submerged system to a partially submerged, wet/dry system. Certain systems and processes of this disclosure may be devoid of certain steps, components and/or features: for example, systems devoid of filter disks; systems devoid of exotic metals; systems devoid of low-strength steels; systems devoid of threaded fittings; systems devoid of welded fittings; processes devoid of a separation step upstream of the filter unit; processes devoid of a pump in the effluent (filtrate) stream conduit of the filter unit.

What is claimed is:

1. An apparatus comprising:
   a) a substantially hollow conduit having a length L and a width W, the conduit defining an interior space, the conduit having a suction source opening and at least one suction opening, the at least one suction opening having a length Ls, where $0<Ls<L$;
   b) a plurality of obstacles threadedly removably attached to the conduit and positioned as a first row of two or more obstacles positioned on a first side of the at least one suction slot opening and a second row of two or more obstacles positioned on a second side of the at least one suction slot opening; and
   c) the obstacles in the first row are offset from the obstacles in the second row.

2. The apparatus of claim 1 wherein the substantially hollow conduit comprises a hollow rectangular box having a bottom face in which the at least one suction opening is a slot positioned and dividing the bottom face into a leading surface and a trailing surface.

3. The apparatus of claim 1 wherein each of the plurality of obstacles are round, substantially flat disc shaped with radiused edges.

4. The apparatus of claim 3 wherein all of the plurality of obstacles have same dimensions, and the first row and the second row each have the obstacles evenly spaced.

5. The apparatus of claim 1 further comprising an adjustable blade attached to the conduit that may be heightened or shortened against a profile of the plurality of obstacles to modify open clearance available for tangential cleaning fluid flow, the blade having an edge shape selected from straight-edged, toothed, and arcuate.

6. The apparatus of claim 1 further comprising, in combination, a spray bar and pump to continuously apply an incompressible fluid to block or partially block void spaces between the plurality of obstacles to influence velocities of cleaning fluid(s).

7. A water or wastewater filtration system comprising:
   a) a filter tank having a floor and sidewall defining a filtration zone, an influent conduit and an effluent conduit;
   b) a filter drum having a filter drum length and radius, the filter drum positioned in the filter tank, the filter drum and the filter tank comprising a filter unit, the filter drum comprising a filter media;
   c) one or more apparatus of claim 1 positioned adjacent, or positionable adjacent, at least some portions of the filter media;
   d) the filter unit configured to produce, either by gravity-driven hydraulic head, one or more pumps, or both, an effluent stream by generating sufficient pressure differential across submerged portions of the filter media to force water from an influent water or wastewater composition to flow from outside to inside the submerged portions of the filter media and into the effluent conduit;
   e) a prime mover for rotating the one or more filtration members; and
   f) a blower and chamber for creating a reduced pressure condition in each of the one or more apparatus of claim 1 when adjacent non-submerged portions of the filter media, the chamber configured to receive wet solids removed from non-submerged, wet solids-laden portions of the filter media by the one or more apparatus of claim 1 subsequent to submerged, fouled portions of the filter media being rotated out of the filtration zone, and wherein the non-submerged filter media from which wet solids have been removed is further cleansed of collected solids and entrapped water employing air drawn from inside of the one or more drum filters by the blower.

8. The system of claim 7 wherein the length of the filter drum and the length of the filter tank are related by a ratio ranging from about 1:2 to about 9:10.

9. The system of claim 7 wherein the one or more apparatus of claim 1 is a single apparatus, the length (L) of the apparatus of claim 1 corresponding substantially with the filter drum length.

10. The system of claim 7 wherein the filter media is a pile cloth filter media.

11. A process for treating water or wastewater using the system of claim 7, comprising:
    a) flowing an influent water composition comprising water and solids into the filter tank;
    b) producing an effluent stream by generating a pressure differential across submerged portions of the filter media of the filter drum, causing water in the influent water composition to flow from outside to inside the submerged portions of the filter media;
    c) rotating the filter drum so that wet, solids-laden submerged portions of the filter media become non-submerged, wet, solids-laden filter media portions; and
    d) removing wet solids from the non-submerged, wet, solids-laden filter media portions by reducing pressure in the one or more apparatus of claim 1, and wherein the non-submerged filter media from which wet solids have been removed is further cleansed of collected solids and entrapped water employing air drawn from inside of the one or more drum filters by the blower.

* * * * *